US010019737B2

(12) United States Patent
Beach

(10) Patent No.: US 10,019,737 B2
(45) Date of Patent: Jul. 10, 2018

(54) IMAGE PROCESSING DEVICE AND METHOD

(71) Applicant: Lewis Beach, Bel Air, MD (US)

(72) Inventor: Lewis Beach, Bel Air, MD (US)

( * ) Notice: Subject to any disclaimer, the term of this patent is extended or adjusted under 35 U.S.C. 154(b) by 137 days.

(21) Appl. No.: 15/069,192

(22) Filed: Mar. 14, 2016

(65) Prior Publication Data

US 2016/0292749 A1 Oct. 6, 2016

Related U.S. Application Data

(60) Provisional application No. 62/143,457, filed on Apr. 6, 2015.

(51) Int. Cl.
| H04N 1/60 | (2006.01) |
| H04N 9/69 | (2006.01) |
| H04N 9/73 | (2006.01) |
| H04N 1/40 | (2006.01) |
| H04N 5/57 | (2006.01) |
| G09G 5/14 | (2006.01) |
| G09G 5/37 | (2006.01) |
| G06T 5/00 | (2006.01) |
| G06T 11/00 | (2006.01) |
| G06T 11/60 | (2006.01) |
| G06Q 30/02 | (2012.01) |
| G09G 5/377 | (2006.01) |

(Continued)

(52) U.S. Cl.
CPC ........ *G06Q 30/0277* (2013.01); *G06T 11/001* (2013.01); *G09G 5/026* (2013.01); *G09G 5/14* (2013.01); *G09G 5/377* (2013.01); *G09G 5/397* (2013.01); *G06T 2210/62* (2013.01); *G09G 2320/066* (2013.01); *G09G 2340/12* (2013.01)

(58) Field of Classification Search
CPC combination set(s) only.
See application file for complete search history.

(56) References Cited

U.S. PATENT DOCUMENTS

| 5,867,170 A | 2/1999 | Peterson |
| 5,974,172 A | 10/1999 | Chen |
| 6,803,968 B1 | 10/2004 | Numata |

(Continued)

OTHER PUBLICATIONS

Notification of Transmittal of International Search Report, and The Written Opinion of the International Searching Authority, or the Declaration (Form PCT/ISA/220) issued in International Application No. PCT/US16/55326 dated Jan. 26, 2017, with Forms PCT/ISA/210 and PCT/ISA/237 (10 pages).

*Primary Examiner* — Wesner Sajous
(74) *Attorney, Agent, or Firm* — Westerman, Hattori, Daniels & Adrian, LLP

(57) ABSTRACT

An image processing device having a processor coupled to a memory. The processor is programmed to process two or more media formats stored in the memory, each media format is made up of a digital image layer that includes non-transparent pixels and may include transparent pixels. The processor is programmed to: set the non-transparent pixels in each of the digital image layer of the two or more media formats to a contrast state, set pixels stored in an off-screen data buffer of the memory to pixels corresponding to a predetermined color scheme, apply an image function to each media format that is drawn to the off-screen data buffer so as to allow the plurality of overlapping media formats to be displayed on the display screen as see through.

23 Claims, 31 Drawing Sheets

(51) Int. Cl.
   *G09G 5/397*   (2006.01)
   *G09G 5/02*    (2006.01)

(56) References Cited

U.S. PATENT DOCUMENTS

| | | | |
|---|---|---|---|
| 6,856,323 | B2 | 2/2005 | Moore |
| 7,012,616 | B1 * | 3/2006 | Chatterjee ................ G06T 1/60 |
| | | | 345/473 |
| 7,623,140 | B1 * | 11/2009 | Yeh ...................... G06T 15/503 |
| | | | 345/522 |
| 8,435,113 | B2 | 5/2013 | Willis et al. |
| 8,487,932 | B1 * | 7/2013 | Ward ...................... G06T 11/60 |
| | | | 345/440 |
| 8,572,501 | B2 | 10/2013 | Ferry et al. |
| 8,588,548 | B2 | 11/2013 | Krolczyk et al. |
| 8,594,195 | B2 | 11/2013 | Jung et al. |
| 9,014,543 | B1 * | 4/2015 | Braun .................. G11B 27/031 |
| | | | 386/280 |
| 2002/0145615 | A1 | 10/2002 | Moore |
| 2003/0043172 | A1 | 3/2003 | Li et al. |
| 2003/0048282 | A1 * | 3/2003 | Grindstaff ................ G06K 9/36 |
| | | | 345/629 |
| 2004/0062439 | A1 | 4/2004 | Cahill et al. |
| 2005/0093890 | A1 | 5/2005 | Baudisch |
| 2005/0143136 | A1 | 6/2005 | Lev et al. |
| 2009/0183080 | A1 | 7/2009 | Thakkar et al. |
| 2011/0246916 | A1 | 10/2011 | Leskela et al. |
| 2012/0139918 | A1 | 6/2012 | Michail et al. |
| 2012/0192235 | A1 * | 7/2012 | Tapley ............. H04N 21/44016 |
| | | | 725/60 |
| 2014/0136332 | A1 * | 5/2014 | Amit ...................... G06Q 50/01 |
| | | | 705/14.66 |

* cited by examiner

IMAGE PROCESSING DEVICE AND METHOD

CROSS-REFERENCE TO RELATED APPLICATION

This application claims the benefit of U.S. Provisional Application No. 62/143,457, filed Apr. 6, 2015, the entire disclosure of which is incorporated herein by reference.

TECHNICAL FIELD

The invention relates a new and innovative image processing device and method for generating and displaying more than one media context concurrently (that is overlapping) with another media context.

BACKGROUND INFORMATION

The following descriptions set forth the inventors knowledge of related art and problems therein and should not be construed as an admission of knowledge of the prior art.

Electronic applications such as games, weather apps, and social networking apps have shared resources with advertisements for many years. One of the standard modes of sharing resources involves subdividing the display resources and allocating some of the display resources to the application and some of the display resources to advertisements. An example of subdividing display resources is banner advertising. As illustrated in FIG. 1, typically a top or bottom fraction of the display 1 is allocated to a banner advertisement 2 and the rest of the display is allocated to an application 3. This approach restricts the size of the advertisement and reduces the display resources allocated to the application. In this approach the display resource is shared between an application and an advertisement. Some studies show that banner advertisements are easily ignored as users focus their attention on the application. Another standard mode of resource sharing involves taking turns using the display. An example of taking turns using the display is the typical interstitial advertisement. FIG. 2A, FIG. 2B and FIG. 2C together illustrate an example of interstitial advertisement. FIG. 2A shows an example of this approach allocating the entire display 1 to an application 3 until some pause in the application, i.e. When the next level in a game is reached. FIG. 2B shows an example of this approach allocating the entire display 1 to an interstitial advertisement 4 during a pause in the application. When the advertisement is over (which might be after a short delay, or after the user interacts with the advertisement, or after a video advertisement has completed, etc.) the entire display 1 is again allocated to an application 3 as shown in FIG. 2C. This approach does not restrict the display resources of the advertisement or the display resources of the application, but it does interrupt the application. In this approach the resource of time is shared between an application and an advertisement. Some studies show that interstitial advertisements are easily ignored. Another standard mode of resource sharing involves allocating actors or entities in an application to advertising. An example of allocating actors or entities in an application to advertising is in-app billboard advertising. Some racing applications depict billboards on the roadside. FIG. 3A shows the entire display 1 allocated to an application enabled for in-app advertisements 5 with a billboard entity 6 allocated to display advertisements. FIG. 3B shows the entire display 1 allocated to an application enabled for in-app advertisements 5 with a billboard entity 6 allocated to display advertisements with an advertisement 7 displayed on the billboard entity 6 as the racer approaches the billboard entity 6. As the racer approaches the billboard the in-app advertisement increases in size. FIG. 3C shows the entire display 1 allocated to the in-app application 5 after the racer has passed by the billboard. This approach restricts the display resources of the advertisement. Some studies show that in-app advertisements are easily ignored.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention provides a new and innovative solution to resource contention in advertising in electronic media. This invention provides methods to keep users eyes focused on advertisements, or other media, during gameplay and during use of other applications. This invention addresses the resource sharing problem by displaying both an application and an advertisement in the same region (the region can be the entire display resource or any part of the display resource or multiple display resources) concurrently. The solution employs mathematical manipulation of the colors of applications and/or advertisements. Advertisers are often very particular about the specific colors displayed in their advertisements, i.e. the color of their logo or the color of their font. Many applications can be used in their original colors just as well as they can be used in any color scheme that provides the contrast needed to distinguish actors and entities in the application and their movements and interactions. This invention allows the display of advertisements in their original colors except where application actors and entities and their interactions need to be discernable. For purposes of explanation 'actors and entities' is here intended to encompass all displayable aspects of typical applications. To provide discernable contrast this invention allows the display of actors and entities in negative colors of an advertisement. In this manner both the advertisement (displayed in the original colors) and the actors and entities in the application (displayed in the negative of the advertisement colors) are discernable. This invention solves the display resource sharing problem of banner advertisements and solves the time resource sharing problem of interstitial advertisements by displaying advertisements concurrently with applications. This invention can have embodiments that do not involve advertising, among which are: Displaying video concurrently with an application (i.e. playing a game while watching a TV show concurrently), displaying chart or graphical information concurrently with a video (i.e. displaying stock information concurrently with a movie), displaying a logo in the negative of an application, and displaying the action of one application while using another application (i.e. seeing the weather app while playing a game).

According to an embodiment, an image processing device and method of this invention includes a processor coupled to a memory and a display screen. The processor is configured to process a plurality of media formats (contexts) stored in the memory where each of the plurality of media formats is made up of a digital image layer that includes non-transparent pixels and/or transparent pixels. The processor sets the non-transparent pixels in each of the digital image layers of the plurality of media formats to a contrast state, for example, white and then sets pixels stored in an off-screen data buffer of the memory to pixels corresponding to a predetermined color scheme, for example, white. The processor then applies an image function to each of the plurality of media formats drawn successively to the off-screen data buffer so as to allow the plurality of overlapping media formats to be displayed on the display screen as see through or transparent or translucent, etc.

In another embodiment of this invention, the processor is further configured to simultaneously draw the off screen buffer and another media format to the display screen by using the same pixels and by displaying the true color information of the another media format and overlapping the shape information of the pixels in the off screen buffer as the image function applied to the true colors of the another media format.

In yet another embodiment of this invention, the image function being a negative blending function that blends the pixels in the off-screen data buffer with the non-transparent pixels in the digital image layer to generate new pixel values in the off-screen data buffer. The new pixel values are generated by negating every pixel in the digital image layer while drawing the digital image layer to the off-screen buffer.

The above and/or other aspects, features and/or advantages of various embodiments of this invention will be further appreciated in view of the following description in conjunction with the accompanying figures. Various embodiments of this invention can include and/or exclude different aspects, features and/or advantages where applicable. In addition, various embodiments of this invention can combine one or more aspects or features of other embodiments where applicable. The descriptions of aspects, features and/or advantages of particular embodiments should not be construed as limiting, other embodiments or claims.

DETAILED DESCRIPTION OF THE INVENTION

Figure 1:
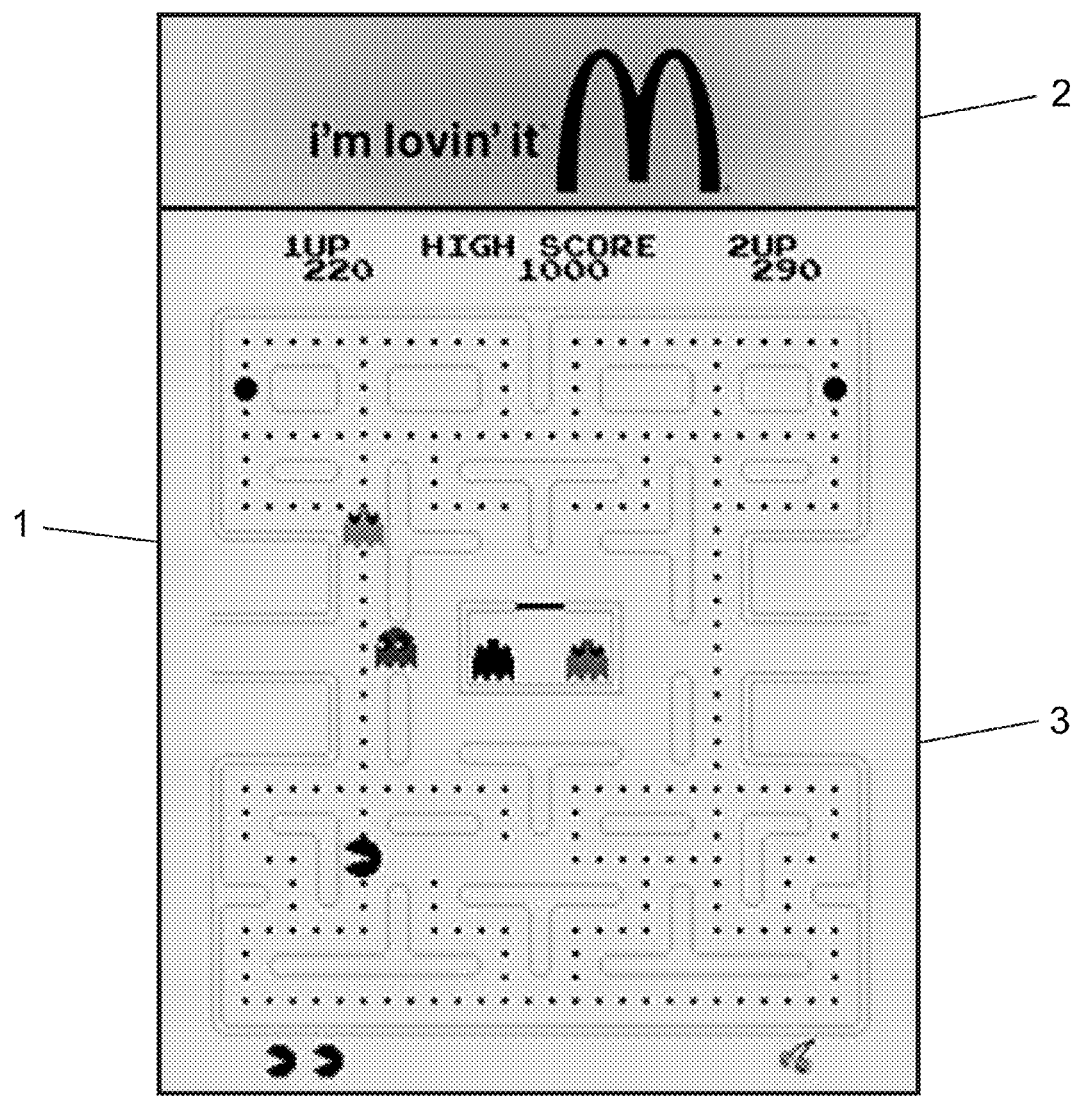
FIG. 1 illustrates a banner advertisement.
Figures 2A, 2B, 2C:
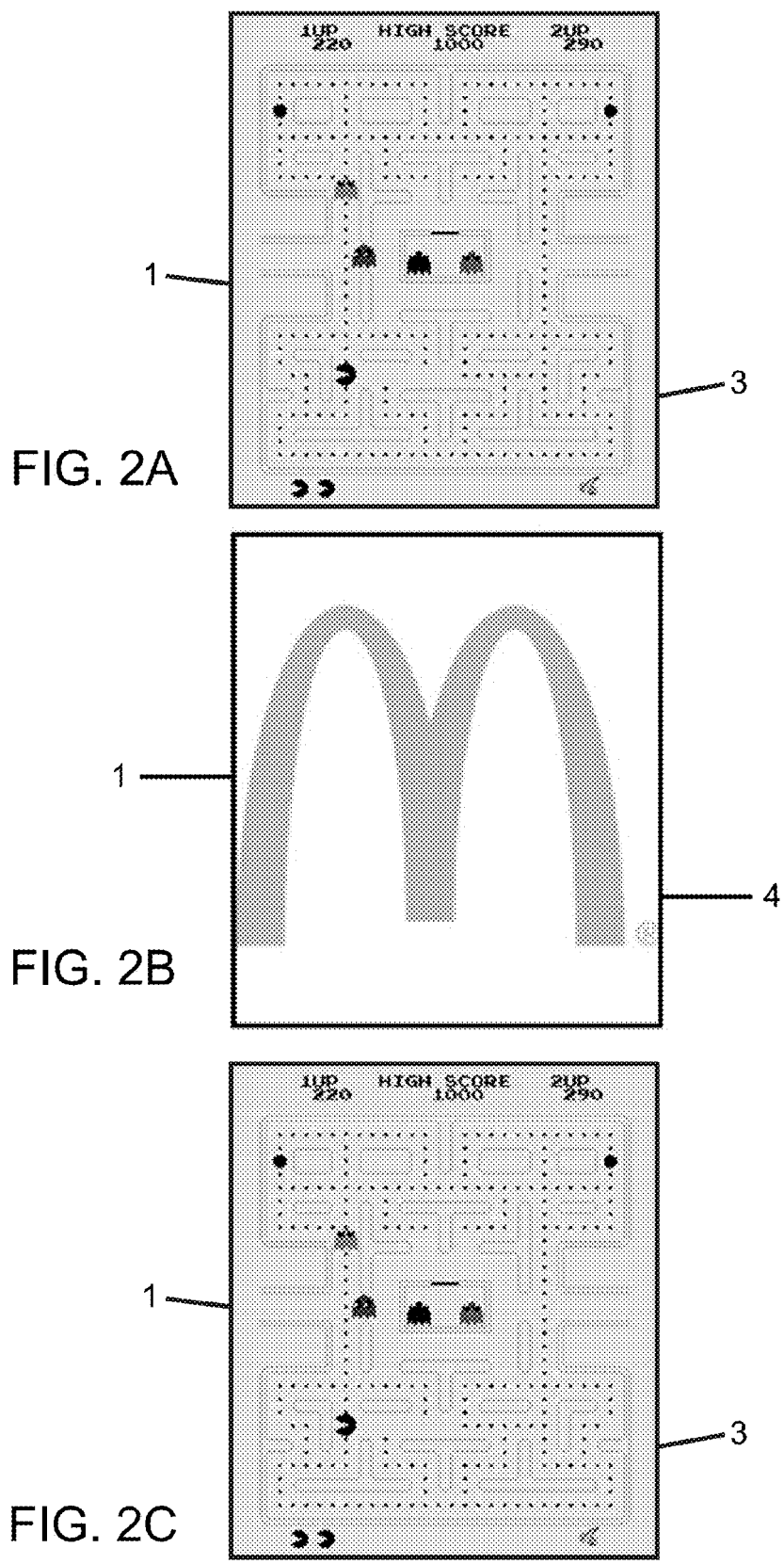
FIG. 2A illustrates an application before the display of an interstitial advertisement.
FIG. 2B illustrates the display of an interstitial advertisement.
FIG. 2C illustrates an application after the display of an interstitial advertisement.
Figure 3A:
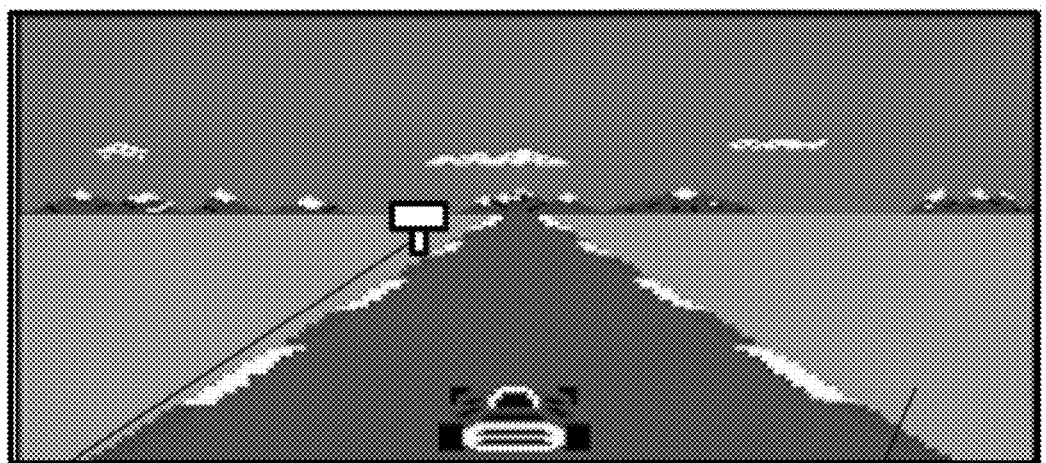
FIG. 3A illustrates an application ready to display an in-application advertisement.
Figure 3B:
FIG. 3B illustrates an application displaying an in-application advertisement.
Figure 3C:
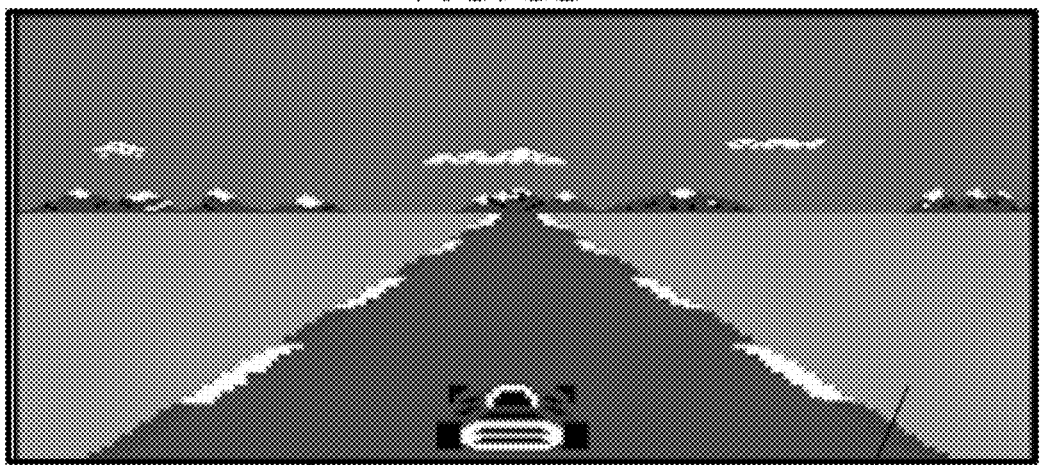
FIG. 3C illustrates an application after displaying an in-application advertisement.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details.

Figure 4A:
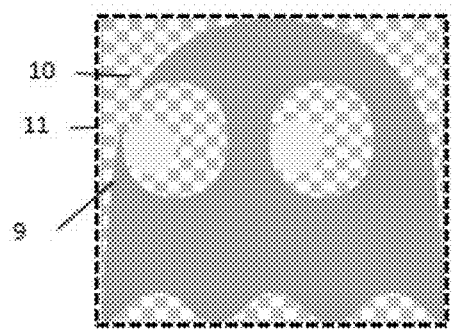
FIG. 4A illustrates a sample actor from an application.
Figure 4B:
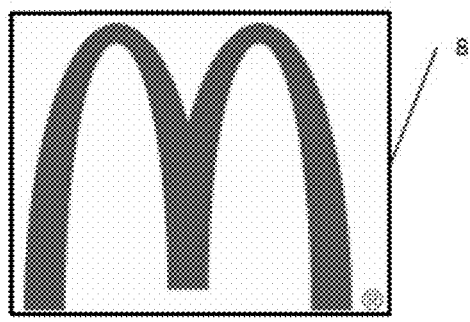
FIG. 4B illustrates a sample advertisement.

In an exemplary embodiment, this aforementioned problem of resource sharing and taking turns may be solved by displaying two contexts, e.g. application (context1) and advertisement (context2), at the same time using the same pixels by displaying the true color information of context2 and overlapping the shape information of context1 as a function applied to the true colors of context2. In a simple embodiment the function could be a standard negative image function. A standard negative image function would display the shape information of context1 as black where context2 is white. A standard negative image function would display the shape information of context1 as white where context2 is black. A standard negative image function would display the shape information of context1 as blue where context2 is yellow, etc. FIG. 4A shows a sample character 9 from a full color PacMan application context1. Typical actors and entities in applications are defined inside rectangular bounding boxes. In order to have actors and entities that are not rectangular when they are rendered into a scene the pixels in the rectangular region that are not part of the actor or entity can be defined as 'transparent' pixels. When the rectangle bounding the actor or entity is drawn the software ignores transparent pixels and draws only the non-transparent pixels. The gray checkboard pattern 10 signifies transparent pixels and the dotted line 11 signifies the rectangular bounding box. The various shades of gray represent different colors used by the sample application. FIG. 4B shows a sample full screen advertisement 8 as context2. Typical advertisements are full color but for purposes of explanation black and white and grayscale are used to represent the true colors of context2.

Figure 4C:
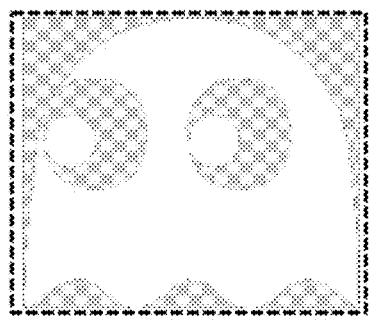
FIG. 4C illustrates shape information of a sample actor from an application.
Figure 4D:
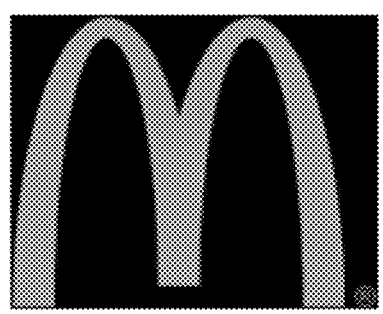
FIG. 4D illustrates a negative of a sample advertisement.
Figure 4E:
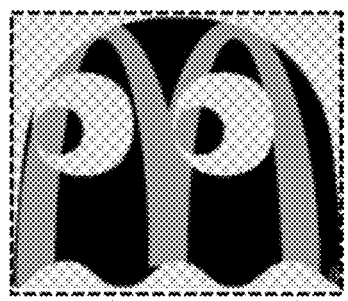
FIG. 4E illustrates shape information of a sample actor displayed using pixel colors of a negative of a sample advertisement.
Figure 4F:
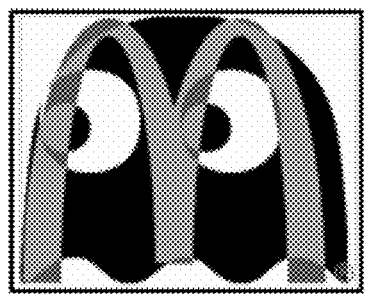
FIG. 4F illustrates a sample advertisement with pixels negated where the shape information of a sample actor overlay the advertisement.

FIG. 4C shows the shape information of FIG. 4A. White represents the essential shape information of a background or actor or entity or other object in an application. FIG. 4D shows the negative image of the sample advertisement of FIG. 4B. FIG. 4E shows the white pixels of FIG. 4C displayed using the corresponding pixel values of the negative image of the sample advertisement shown in FIG. 4D. FIG. 4F shows the sample advertisement of FIG. 4B with the shape information of FIG. 4C displayed using the pixel values of FIG. 4D. In FIG. 4F every pixel of the sample advertisement is displayed as either the original color value of the advertisement or the negative of the original color value of the advertisement. Where the shape information of FIG. 4C is not white the original color value of the advertisement is displayed. Where the shape information of FIG. 4C is white the negative of the original color value of the advertisement is displayed. Where the pixels of FIG. 4C are transparent the original color value of the advertisement is displayed.

Conceptually a standard negative image function provides two states—the positive state shows context2 in original RGB colors and the negative state shows context2 in the negative of the original RGB colors. This two state functionality provides contrast to discern shape information of context1. Several other standard image functions can be applied to provide two states, e.g. sepia, grayscale, charcoal, etc.

Figure 5A:
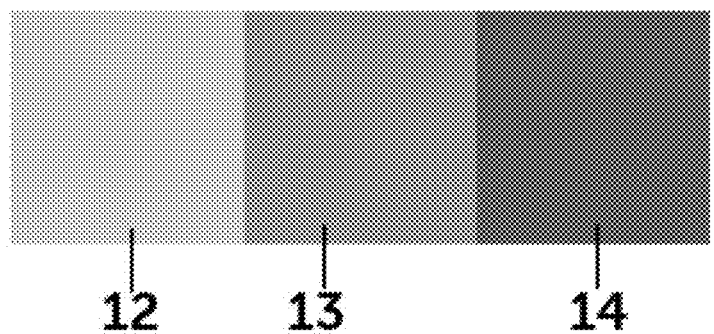
FIG. 5A illustrates light, medium and dark gray.
Figure 5B:
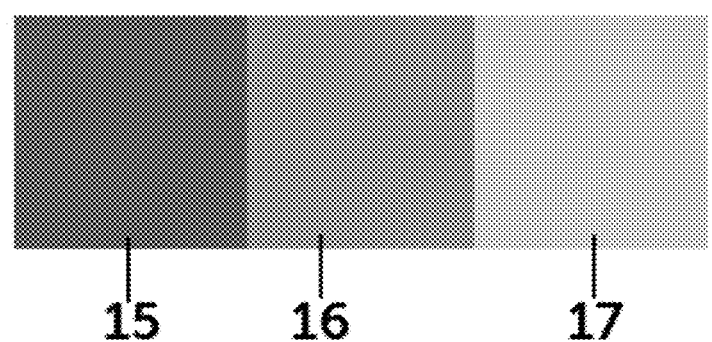
FIG. 5B illustrates the negative of light, medium and dark gray.
Figures 12A, 12B:
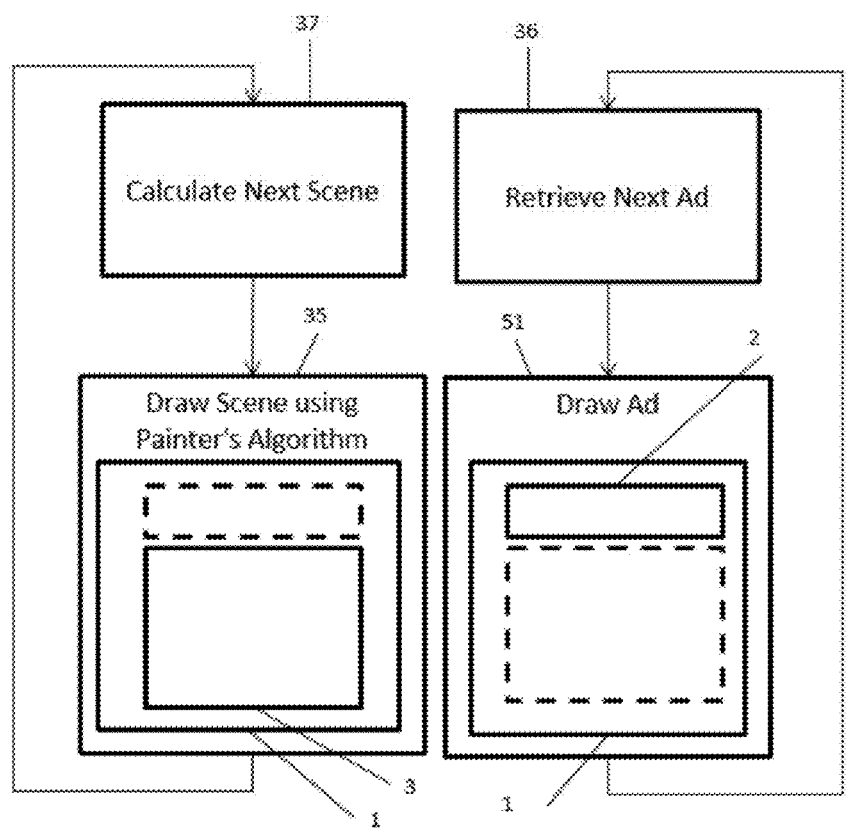
FIG. 12A illustrates a flow chart of an application thread drawing to a lower part of the display.
FIG. 12B illustrates a flow chart of an advertisement thread drawing to an upper part of the display.
Figure 13:
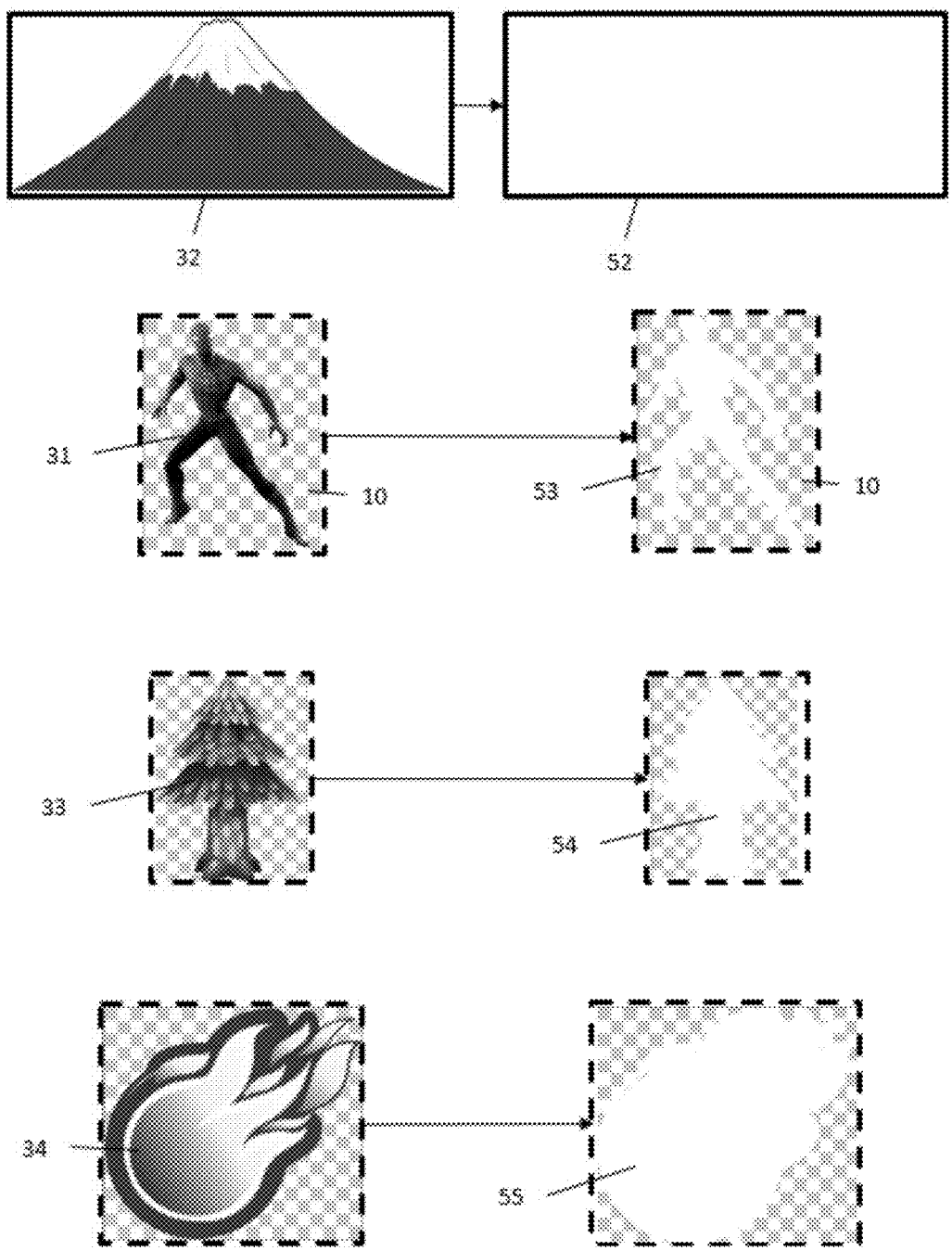
FIG. 13 illustrates a preprocessing step.
Figure 14:
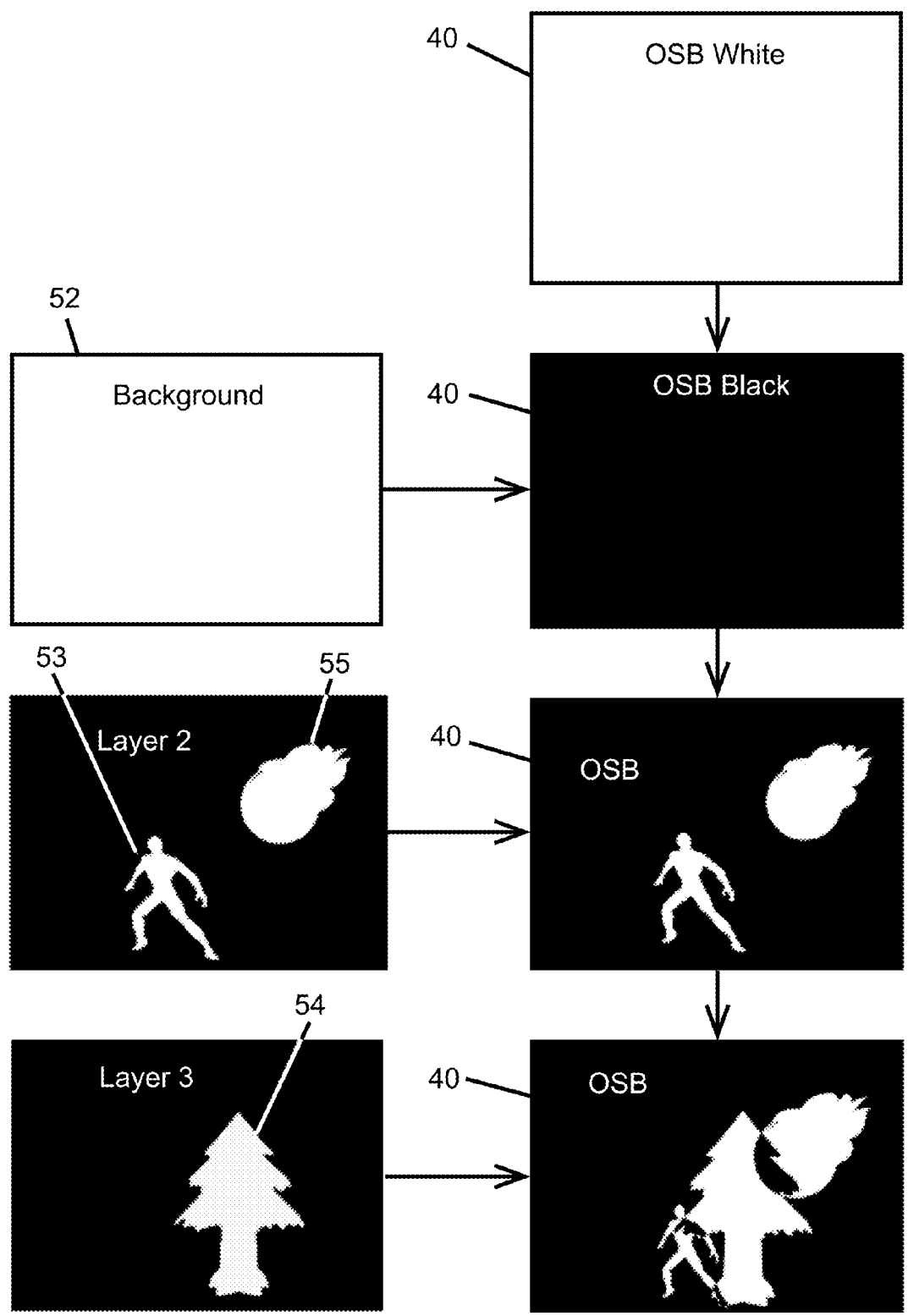
FIG. 14 illustrates a modified painter's algorithm.

Negating an image provides discernible contrast except where the image is gray. The negative of gray is gray. FIG. 5A shows a sample grayscale image with light gray 12, medium gray 13, and dark gray 14. FIG. 5B shows the negative of FIG. 5A. Note that the negative of light gray 12 is dark gray 15 and the color difference between FIG. 5A 12 is visually discernible from FIG. 5B 15. The negative of dark gray 14 is light gray 17 and the color difference between FIG. 5A 14 is discernible from FIG. 5B 17. But the negative of medium gray 13 is medium gray 16. Note that the color of FIG. 5A 13 is not visually discernible from the color of FIG. 5B 16. Some embodiments of this invention provide various solutions to this 'grayness' problem.

Typical 8-bit RGB colors range from (0,0,0) black to (255,255,255) white. Gray colors are close to (128,128,128).

Many applications require more than two states to effectively distinguish between actors and entities and their interactions. Some embodiments of this invention negate individual color channels to provide eight states; Context2 unfiltered and context' displayed using seven function variations of context2. The colors of context2 can be represented as RGB (Red, Green, Blue). RGB represents the 'unfiltered' state. Negating just the red channel and not the green or blue channels can be represented as RnGB (Red Negated). Negating all three channels can be represented as RnGnBn. The eight permutations can provide eight distinct states; RGB, RGBn, RGnB, RGnBn, RnGB, RnGBn, RnGnB, RnGnBn. The same eight permutations can be achieved using other functions besides negative, e.g. sepia, grayscale, charcoal, etc. i.e. applying a sepia function to just the red channel and not the green or blue channels can be represented as RsGB (Red sepia functioned), etc.

Figure 6A:
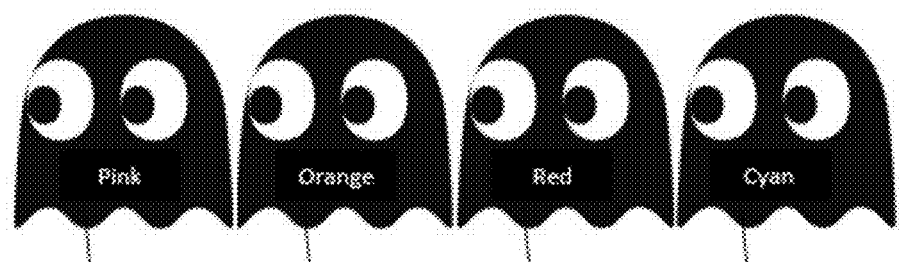
FIG. 6A illustrates four sample characters from an application.
Figure 6B:
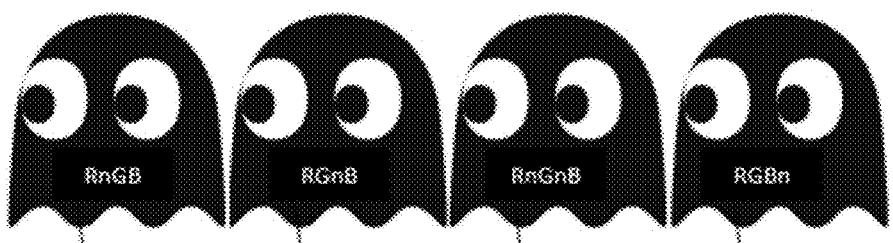
FIG. 6B illustrates four sample characters from an application assigned various color channel permutations.
Figure 6C:
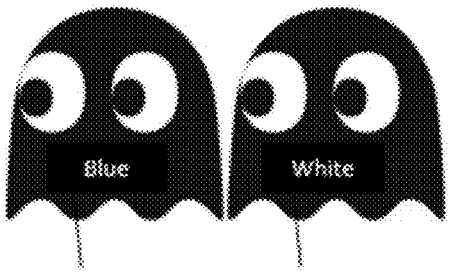
FIG. 6C: illustrates two sample character states from an application.
Figure 6D:
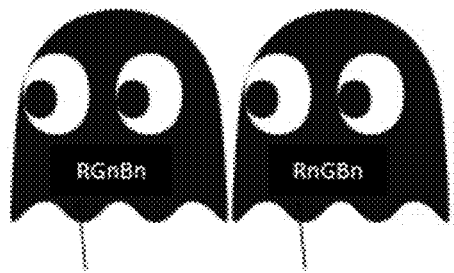
FIG. 6D illustrates two sample character states from an application assigned various color channel permutations.

Multiple states can be used by context1 as multiple colors or as multiple layers or as multiple visual effects or as combinations of colors, layers, and visual effects. FIG. 6A shows characters in the PacMan game as Pinky=pink 18, Clyde=orange 19, Blinky=red 20, and Inky=cyan 21. FIG. 6B shows the same characters with various function states assigned; Pinky=RnGB 62, Clyde=RGnB 63, Blinky=RnGnB 64, and Inky=RGBn 65. When drawn in separate function states the characters can visually retain their separate identities. The PacMan game has states where the characters are blue and flash white. These states are different from when they are pink, orange, red, and cyan. FIG. 6C shows one character all blue 66 and one character all white 67. These two states (blue and white) can be assigned to two of the remaining function states. FIG. 6D shows blue is assigned to RGnBn 68 and white is assigned to RnGBn 69.

Figure 7A:
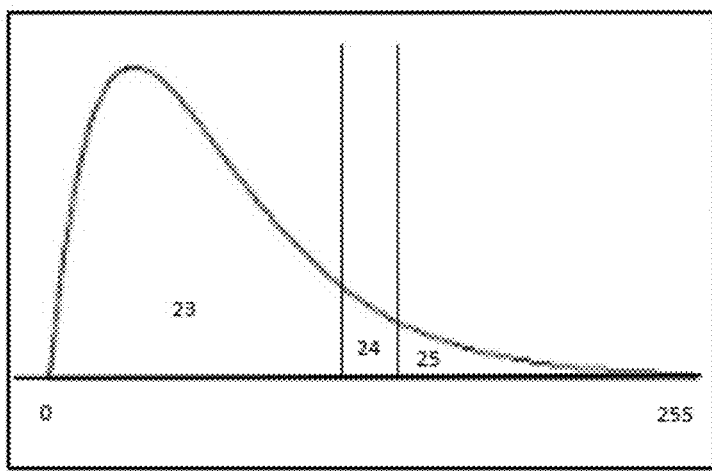
FIG. 7A illustrates a red channel histogram.
Figure 7B:
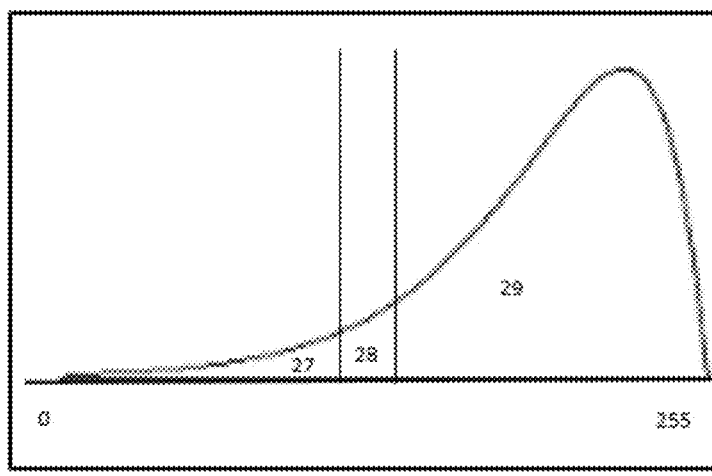
FIG. 7B illustrates the negative of a red channel histogram.
Figure 7C:
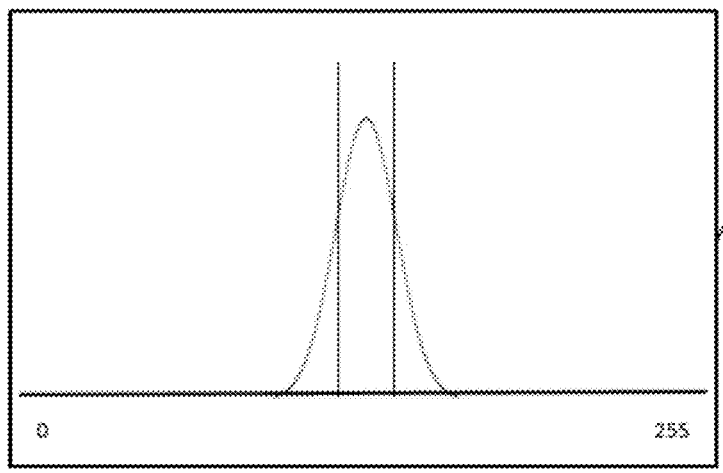
FIG. 7C illustrates a narrow red channel histogram.

When negating individual RGB channels the 'grayness' problem can occur in each separate channel, i.e. there are 'redness', 'greenness' and 'blueness' problems. FIG. 7A shows a sample red channel histogram 22. The majority of the red pixels are in region 23 which is light red. The next largest number of pixels is in region 25 which is dark red. The smallest number of pixels is m region 24 which is medium red. FIG. 7B shows the histogram of the red channel of FIG. 7A negated 26. There is high contrast between the pixels in FIG. 7A 23 light red and those same pixels negated in FIG. 7B 29 dark red. There is high contrast between the pixels in FIG. 7A 25 dark red and those same pixels negated in FIG. 7B 27 light red. Note that the pixels in FIG. 7A 24 medium red will have similar intensity to the same pixels negated in FIG. 7B 28 medium red. FIG. 7C shows a sample red channel histogram 30 where the 'redness' problem would be extreme because the majority of the pixels are in the region that is medium red. Some embodiments of this invention provide various solutions to the 'redness', 'greenness', and 'blueness' problems.

Figure 8A:
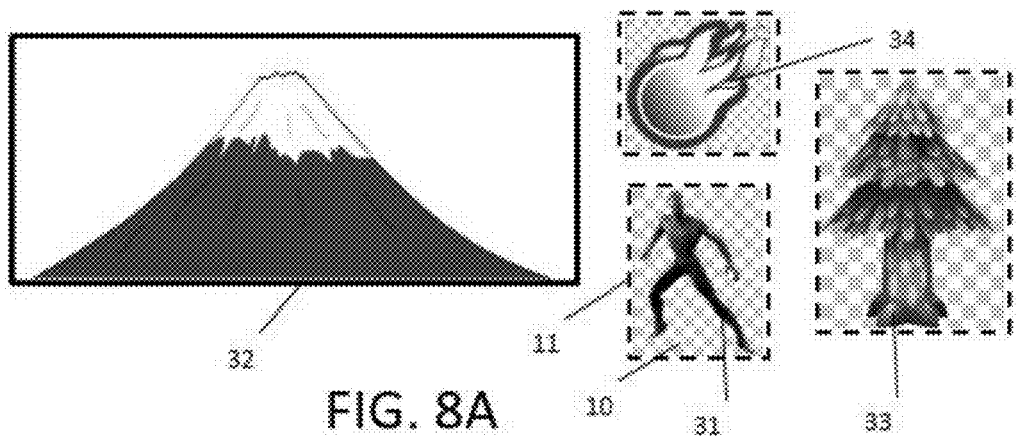
FIG. 8A illustrates sample actors entities and background.
Figure 8B:
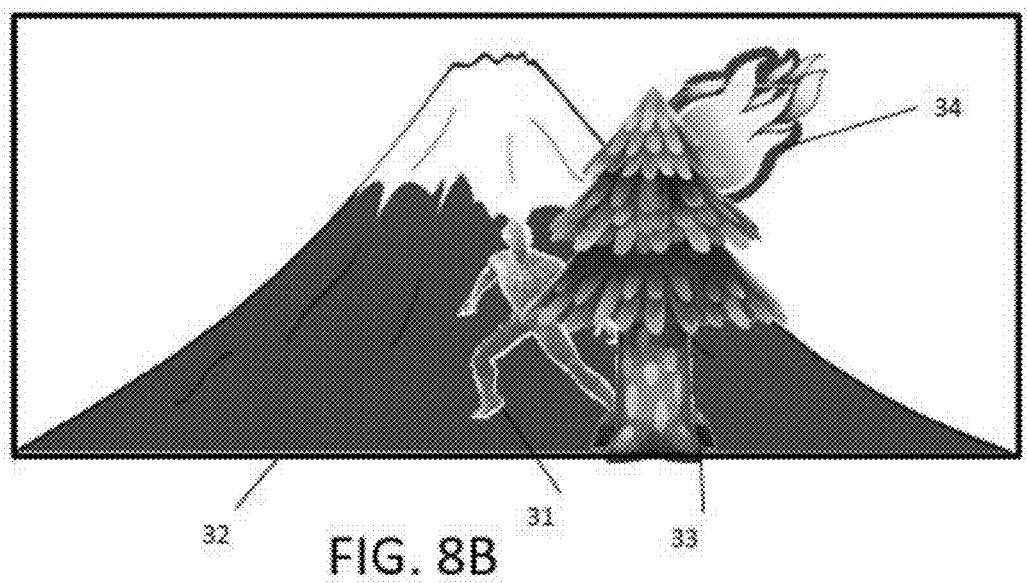
FIG. 8B illustrates actors, entities and background arranged in layers.
Figure 8C:
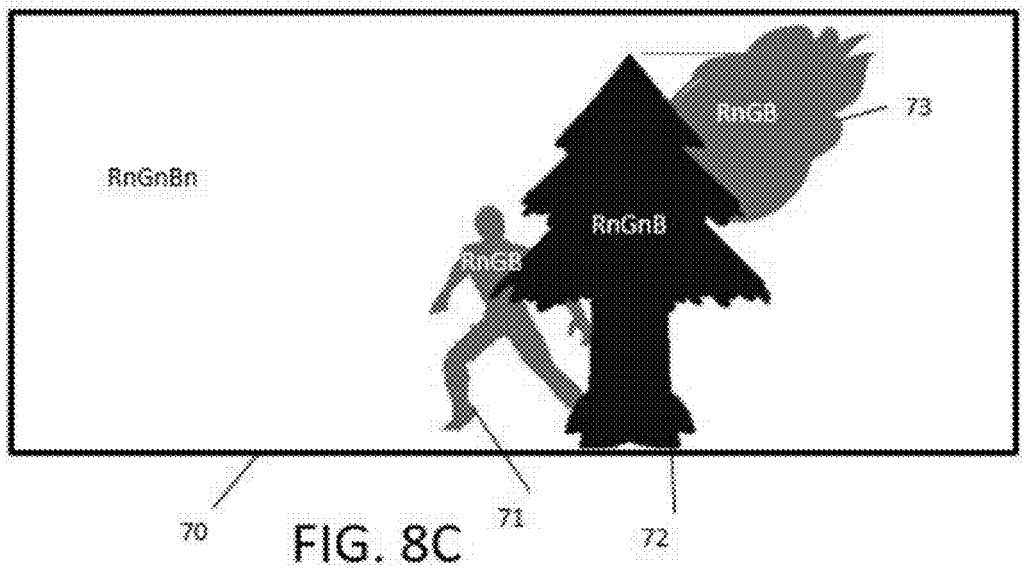
FIG. 8C illustrates actors, entities and background assigned various color channel permutations arranged in layers.

Layers are used to give 2.5D effect displaying some actors and entities behind other actors and entities and in front of other actors and entities and backgrounds. FIG. 8A shows a man actor 31, a comet actor 34, a background 32, and a tree entity 33 from a sample application. The man actor 31 and tree entity 33 and comet actor 34 each have a rectangular bounding box 11 around them and are surrounded by transparent pixels 10. The background 32 has no transparent pixels. FIG. 8B shows the man actor 31 and the comet actor 34 in front of the background 32 and behind the tree entity 33. Some embodiments of this invention can maintain the 2.5D effect of being drawn in layers by assigning various color channel negations to individual layers. The background layer could be drawn in RnGnBn, the entities and actors in the middle layer could all be drawn using RnGB, and actors and entities in the foreground layer could all be drawn using RnGnB. FIG. 8C shows the background layer drawn in RnGnBn 70, the man actor drawn in RnGB 71, the comet actor drawn in RnGB 73, and the tree entity drawn in RnGnB 72. This approach preserves actor and entity shape information in layers.

Some embodiments of this invention can provide twenty-seven states by allowing three states per color channel, i.e. the three states might be unfiltered, negated, and sepia. Then context2 could be displayed as unfiltered and context1 could be displayed using twenty-six function variations of context2.

Various embodiments of this invention can have different sources for context1 and context2. One context could be an application and the other context could be an advertisement, or vice versa. One context could be video or animation and the other context could be displayed as an overlay which displays the video through a function. Both contexts could be applications. These are listed as examples of different sources for context1 and context2 and are not intended to be an exhaustive list.

Various embodiments of this invention can use color schemes other than RGB, e.g. CMYK. This same image processing device and method can be applied to different color schemes.

Various embodiments of this invention can utilize images defined as raster or vector. For purposes of explanation raster images are assumed. This same image processing device and method can be applied to vector images.

Many Integrated Development Environments (IDEs) provide functionality to computer programmers for software development. Many IDES include image editing functionalities. Typical scene rendering in an IDE includes capabilities for drawing scenes one layer at a time in which successively drawn layers overwrite previously drawn layers (painter's algorithm) and capabilities for applying image functions when drawing. Typical image functions include grayscale, sepia, blur, brightness, contrast, invert (negative), saturate, opacity, and blending. IDEs could be expanded to provide the new functionality described in this invention.

Many advertising networks provide Software Development Kits (SDKs) that developers can include in their applications to allow the displaying of advertisements. Typical SDKs allow display of banner, interstitial, and in-app advertisements. SDKs could be expanded to provide the new functionality described in this invention.

Applications often allow/require user interaction in the form of clicking, dragging, squeezing, swiping, etc. Advertisements often allow/require user interaction in the form of clicking through, making a selection, etc. The challenge of allowing/requiring user interaction for both application and advertisement concurrently can be overcome in various ways, e.g. by allocating a hot-spot on the display reserved for advertisement click through. Other methods might select a particular actor or entity as the click through agent for the advertisement. Another method might allow the advertiser to provide an additional actor or entity, e.g. an icon or logo, which is displayed. This additional actor or entity could be displayed in a static location or be made to move to locations on the display away from current user interaction. These are listed as examples of allowing user interaction when more than one context is displayed concurrently and are not intended to be an exhaustive list.

Figure 9A:
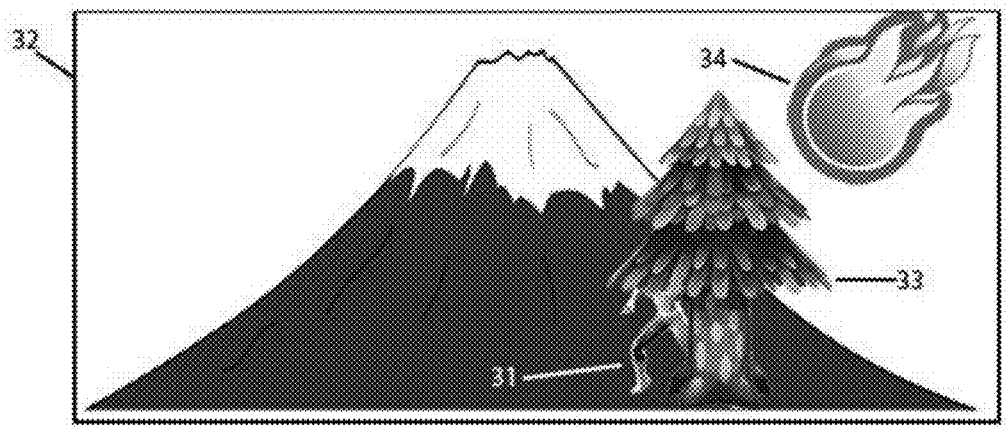
FIG. 9A illustrates an application interaction with actors on the right side of the scene and separated some distance.
Figure 9B:
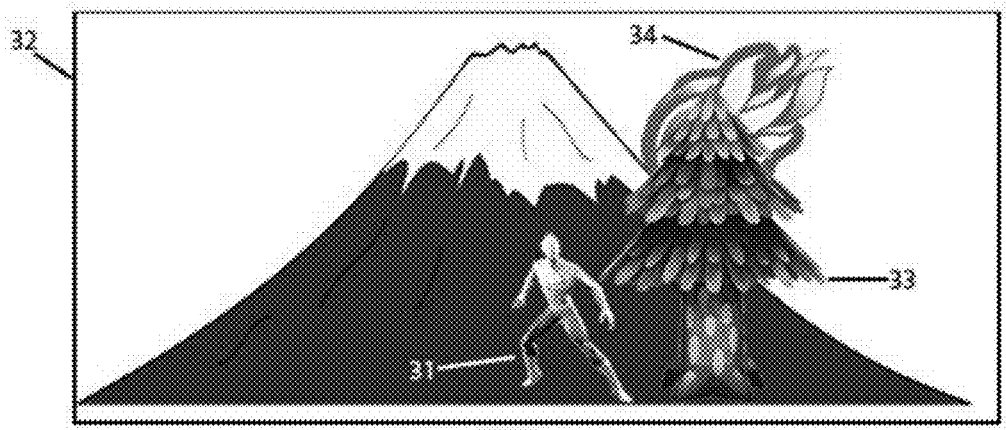
FIG. 9B illustrates an application interaction with actors closer to the center of the scene and separated a smaller distance.
Figure 9C:
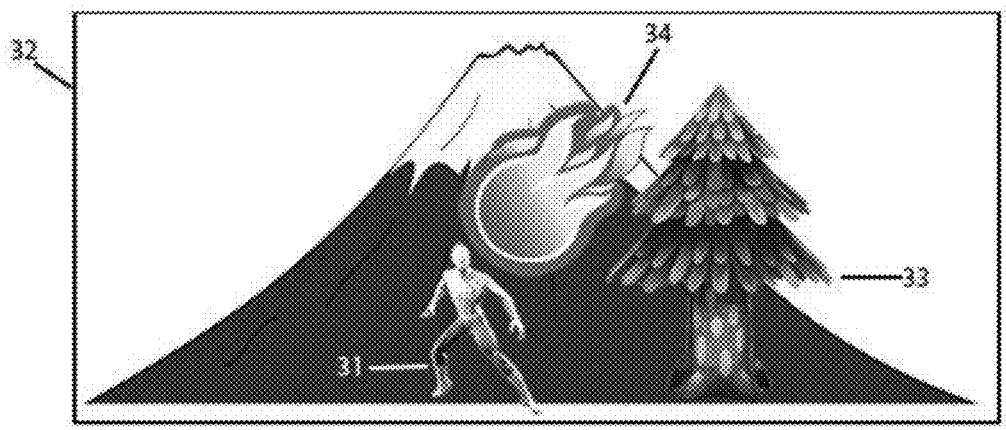
FIG. 9C illustrates an application interaction with actors to the left of the center of the scene and almost touching.

FIG. 9A illustrates an application interaction with man actor 31 and comet actor 34 on the right side of the scene and separated by some distance. The man actor 31 appears to be behind the tree entity 33 and in front of the background 32. FIG. 9B illustrates an application interaction with man actor 31 and comet actor 34 closer to the center of the scene and separated by a smaller distance. The man actor 31 appears to be in front of the background 32 and the comet actor 34 appears to be behind the tree entity 33. FIG. 9C illustrates an application interaction with man actor 31 and comet actor 34 to the left of the center of the scene and almost touching. The man actor 31 and comet actor 34 appear to be in front of the background 32. The background 32 is a background image that occupies the entire display region. Typically, there is no interaction between the background and any actors or entities. Background is often filler, or branding, or intended to add interesting imagery. Typically; backgrounds are displayed as either stationary or moving. Stationary backgrounds are usually the same size as the display region. Moving backgrounds are usually larger than the display region so that successive frames can display different portions of the background to give the appearance of motion. For purposes of explanation a stationary background is used but this invention applies to moving backgrounds as well.

Figure 10A:
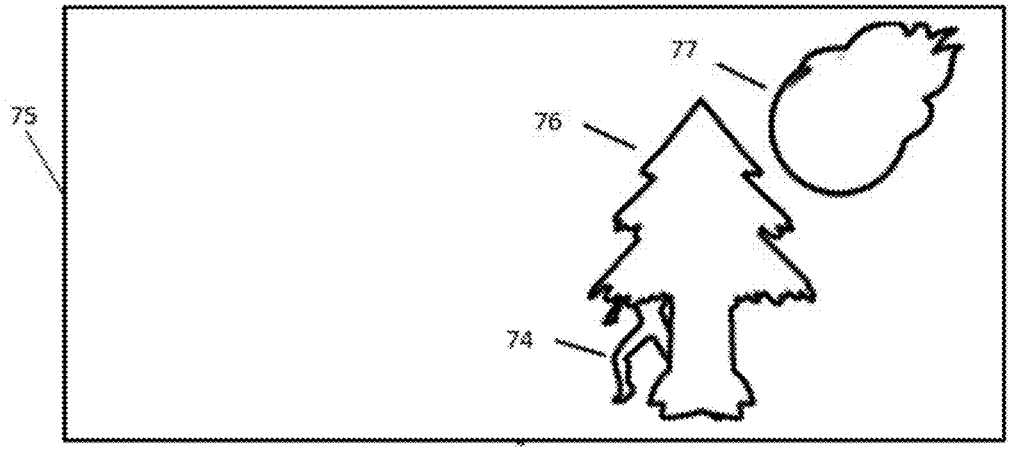
FIG. 10A illustrates an application interaction with actors on the right side of the scene and separated some distance without color.
Figure 10B:
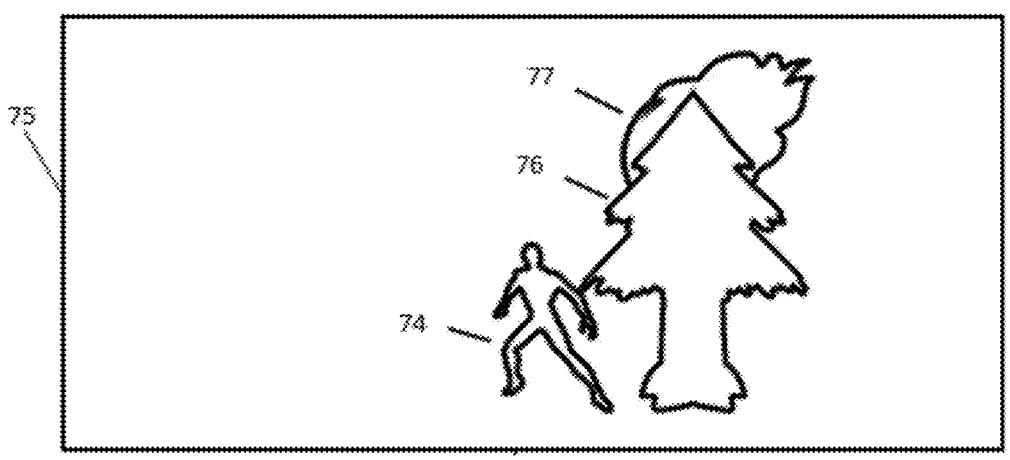
FIG. 10B illustrates an application interaction with actors closer to the center of the scene and separated a smaller distance without color.
Figure 10C:
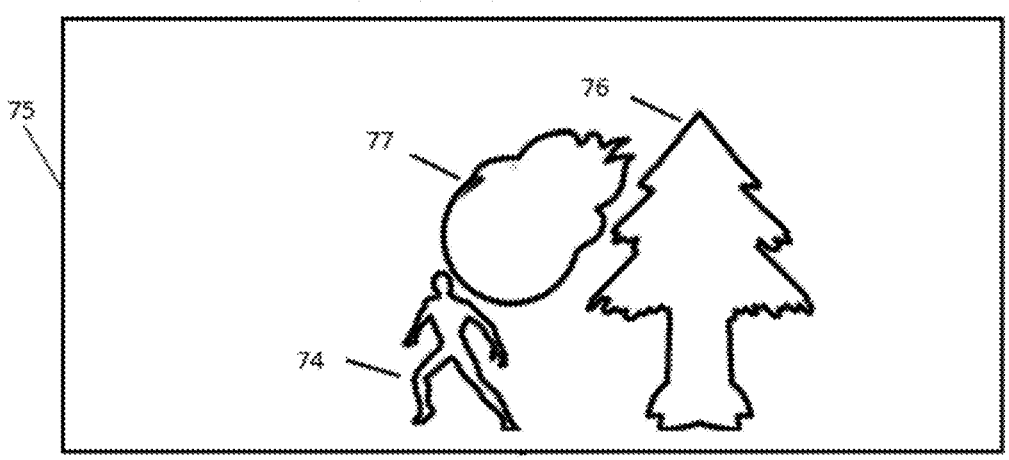
FIG. 10C illustrates an application interaction with actors to the left of the center of the scene and almost touching without color.

FIG. 10A shows FIG. 9A without color information. FIG. 10B shows FIG. 9B without color information. FIG. 10C shows FIG. 9C without color information. FIG. 10A illustrates an application interaction with man actor without color information 74 and comet actor without color information 77 on the right side of the scene and separated by some distance. The man actor 74 appears to be behind the tree entity without color information 76. FIG. 10B illustrates an application interaction with man actor 74 and comet actor 77 closer to the center of the scene and separated a by smaller distance. The comet actor 77 appears to be behind the tree entity 76. FIG. 10C illustrates an application interaction with man actor 74 and comet actor 77 to the left of the center of the scene and almost touching. Note that the shapes/outlines are evident in the actors and entities. Note that prototypical interaction is still apparent.

FIG. 9A, FIG. 9B. FIG. 9C and FIG. 10A, FIG. 10B, FIG. 10C demonstrate that some applications can exhibit actor and entity interaction with or without color information, i.e. only shape information is required. In order to discern overlapping actors and entities this invention can have multiple embodiments. A first embodiment utilizes two contrast states: Positive and Negative. A second embodiment utilizes eight contrast states: RGB, RGBu, RGnB, RGnBn, RnGB, RnGBn, RnGnB, RnGnBn. Further embodiments utilize different numbers of contrast states.

Figure 11A:
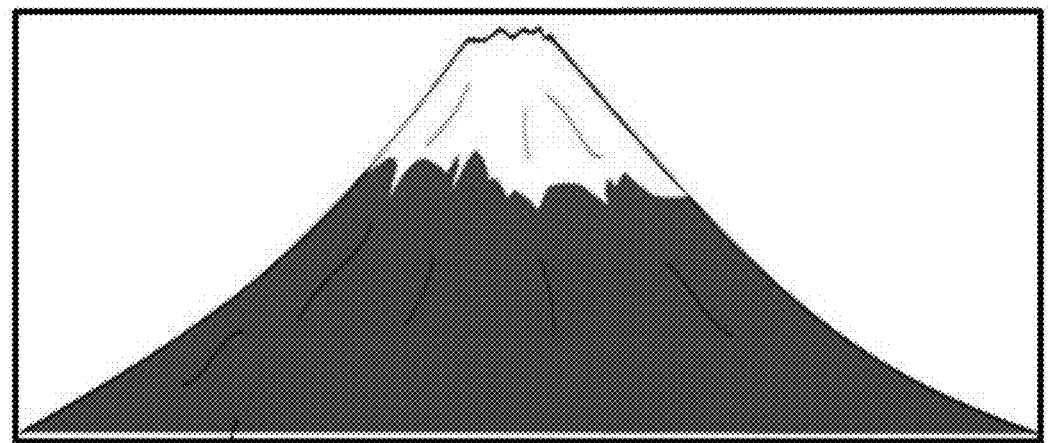
FIG. 11A illustrates a painter's algorithm with a background layer drawn first.
Figure 11B:
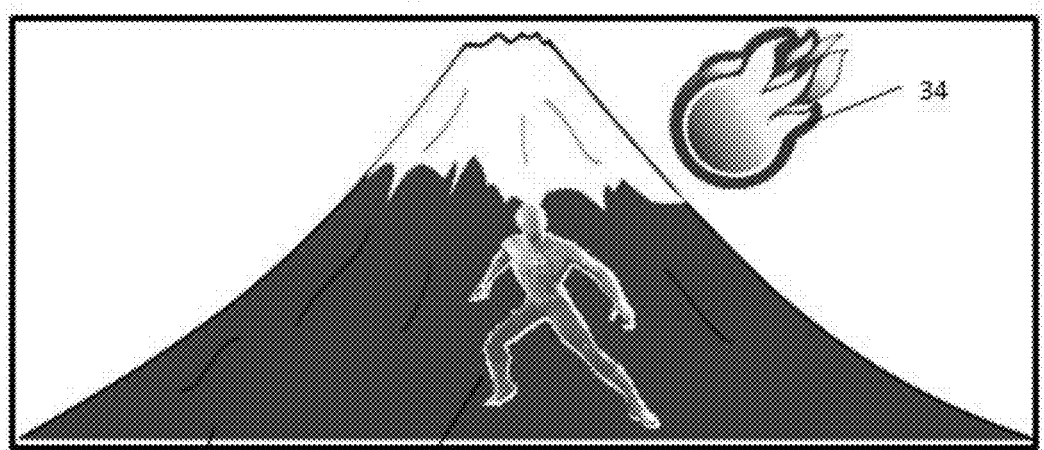
FIG. 11B illustrates a painter's algorithm with a second layer drawn over the background layer.
Figure 11C:
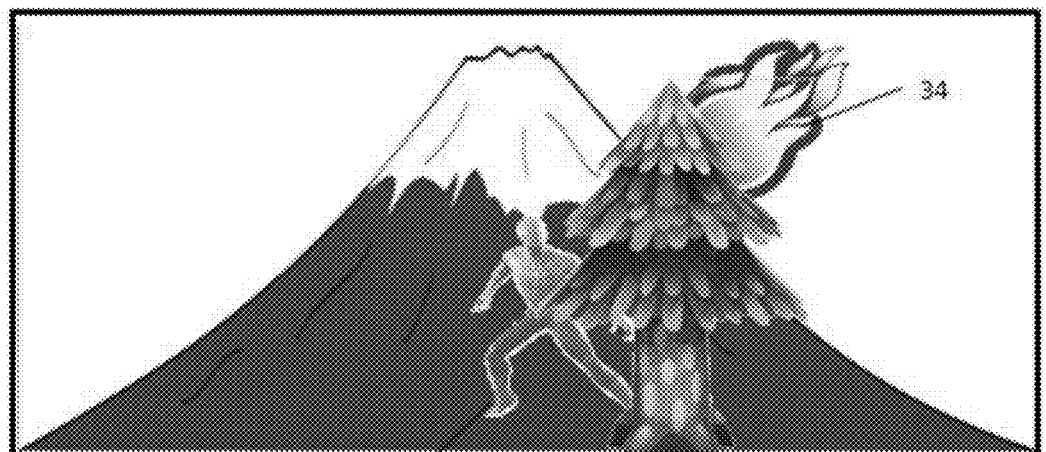
FIG. 11C illustrates a painter's algorithm with a third layer drawn over the second and background layers.

Each scene in many typical applications is drawn using a painter's algorithm. Scenes are usually defined in layers that are different distances from the viewer. FIG. 11A shows a typical background 32 scene rendered using the painter's algorithm. The background layer (layer1) is the furthest from the viewer. FIG. 11A shows the background drawn first. The next furthest layer (layer2) from the viewer (which is the closest layer to the background) is then drawn on top of the background. The man actor 31 and the comet actor 34 are defined to be in layer2 drawn in FIG. 11B. FIG. 11B shows that pixels drawn in layer2 obscure some of the pixels drawn in layer1, i.e. the pixels in the background 32 that are 'behind' the man actor 31 are not displayed, they were 'painted' over. FIG. 11C shows that the tree entity 33, defined to be in layer3, is drawn last. The pixels in tree entity 33 obscure some of the pixels in the man actor 31 and comet actor 34 and also obscure some of the pixels in the background 32. The painter's algorithm draws scenes to display some actors and entities as 'behind' other actors and entities and 'in front of' other actors and entities and backgrounds.

When advertising is incorporated into an application there are typically multiple threads of execution running concurrently. One thread can be for the application and one thread can be for the advertisement. FIG. 12A and FIG. 12B show two threads running concurrently where the advertisement is a banner advertisement. Similar logic is employed for other types of advertisements. FIG. 12A shows the application thread. The application calculates the next scene to be drawn 37, then draws that scene using the painter's algorithm 35. In this example the application 3 is drawn in a lower portion of the display 1. Concurrently the advertisement thread retrieves the next advertisement 36 then draws the advertisement 51 as shown in FIG. 12B. In this example the advertisement 2 is drawn in as top portion of the display 1. Note that the application thread draws only in the display region allocated to the application and the advertisement thread draws only in the display region allocated to the advertisement.

In an exemplary embodiment this invention adds a preprocessing step to the typical application thread. FIG. 13 shows a preprocessing step of replacing every non-transparent pixel in actors, entities, and backgrounds with white (255). Every pixel of the application that is to be drawn can first be set to the color white. The original image is on the left and the preprocessed image is on the right. Note that the background image is filled completely with white. The background 32 is an image that occupies the entire display region. Typically, there is no interaction between the background and any actors or entities. When every pixel in the background image 32 is set to white the entire preprocessed background image 52 is white. When every non-transparent pixel in the man actor 31 is filled with white the resulting preprocessed man actor 53 retains the shape information of the man actor. When every non-transparent pixel in the tree entity 33 is filled with white the resulting preprocessed tree entity 54 retains the shape information of the tree entity. When every non-transparent pixel in the comet actor 34 is filled with white the resulting preprocessed comet actor 55 retains the shape information of the comet actor. Note also that transparent pixels 10 remain transparent.

In an exemplary embodiment this invention adds an offscreen buffer to the typical application thread. Instead of drawing each scene to the onscreen display using the painter's algorithm, each scene is first drawn to the offscreen buffer using as modified painter's algorithm. FIG. 14 demonstrates the modified painter's algorithm. First the offscreen buffer (OSB) 40 is set to white. Then the preprocessed background 52 (layer1) is drawn to the OSB using a negative blending function. Blending functions blend pixels in the OSB with pixels in the next layer to produce the new offscreen pixel value. If an offscreen pixel has the value A and a corresponding pixel in the next layer has the value B then a negative blending function will yield the new value C for the offscreen pixel of C=255−ABS(255−A−B), where ABS is absolute value. This is a typical negative blending function used by image processing software. Note that drawing an all white background to an all white OSB results in the entire OSB being black. That is because the effect of the negative blending function is to negate every pixel in the OSB where the corresponding pixel being drawn is white. Because the entire preprocessed background layer 52 is white the blending function negated every pixel in the OSB. The background image for some applications will not be completely filled with white. A solid white background is used here for purposes of explanation. If a solid white background is assumed, then the steps of filling the background and OSB with white and then drawing the preprocessed background to the OSB using a negative blending function could be replaced with a step that fills the OSB with black. The next furthest layer from the viewer, layer2, is then drawn onto the OSB 40 using a negative blending function. The preprocessed man actor 53 and the preprocessed comet actor 55 are defined to be in layer2. When the pixels in layer2 are drawn to the OSB using a negative blending function the white pixels negate the existing pixels in the OSB, i.e. a white pixel in layer2 will turn a black pixel in the OSB white, and a white pixel in layer2 will turn a white pixel in the OSB black. Note that transparent pixels in a layer do not affect corresponding pixels in the OSB. Note that black pixels in a layer do not affect corresponding pixels in the OSB. Finally, the preprocessed tree entity 54, defined to be in layer3, is drawn last. In the previously defined painter's algorithm the pixels in the tree entity 33 obscure some of the pixels in the man actor 31, the comet actor 34, and the background 32. In the previously defined painter's algorithm scenes are drawn to display some actors and entities as 'behind' other actors and entities and in front of other actors and entities and backgrounds. The modified painter's algorithm draws scenes to display entities as 'see through'—the preprocessed man actor 53 and the preprocessed comet actor 55 can be seen through the preprocessed tree entity 54. Conceptually the man actor and comet actor and tree entity appear to be drawn in the same layer.

Figure 15:
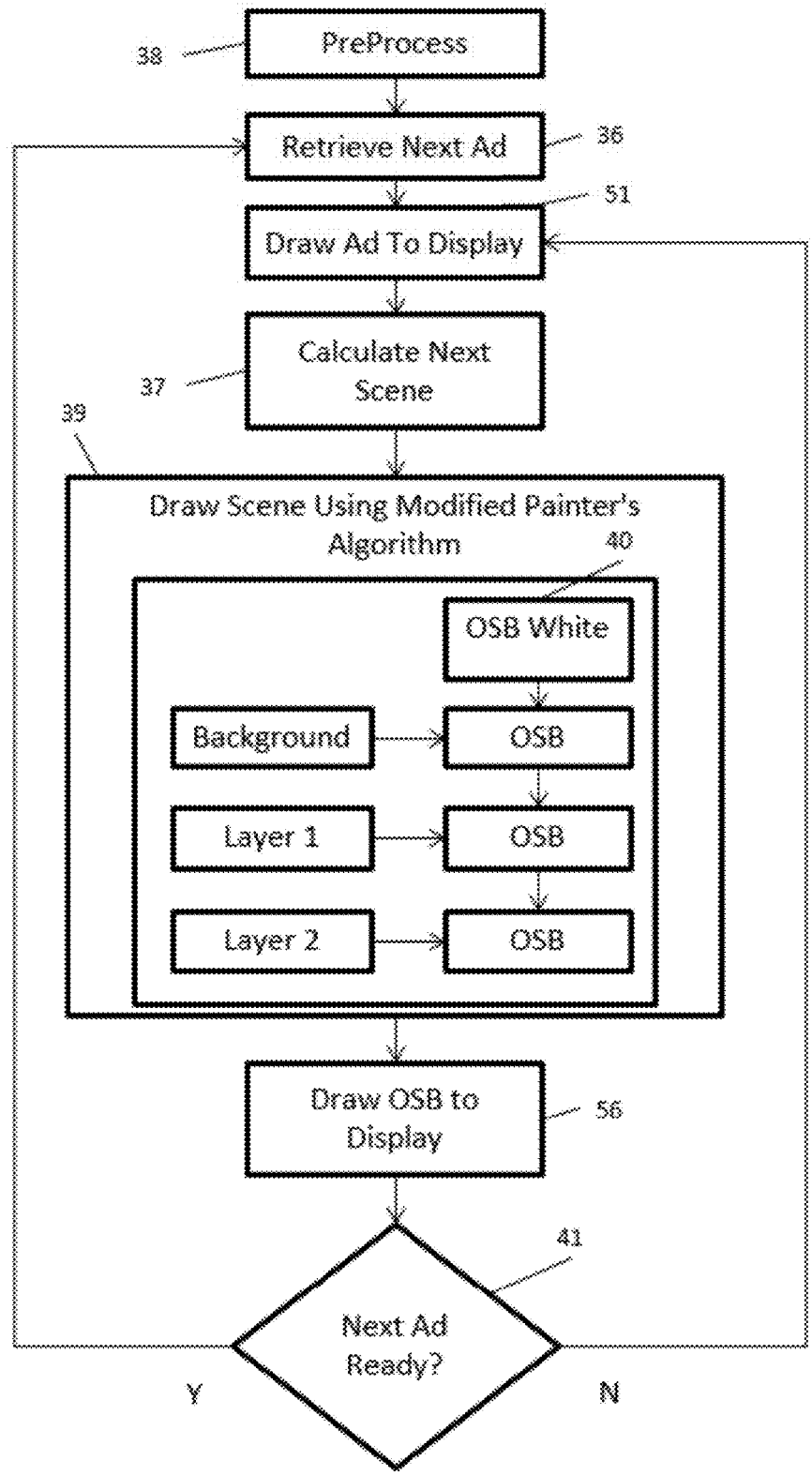
FIG. 15 illustrates a modified application thread with advertisement thread.

FIG. 15 shows the modified application thread from FIG. 12A combined with the advertisement thread of FIG. 12B to display both application (context1) and advertisement (context2) at the same time using the same pixels by displaying the true color information of context2 and overlapping the shape information of context1 as a function applied to the true colors of context2. First the preprocessing step 38 replaces every non-transparent pixel in actors, entities, and backgrounds with white (255). The next step to retrieve the next advertisement (context2) 36. The current advertisement is drawn to the display 51 until another advertisement is retrieved. The advertisement may be drawn fullscreen or to any portion of the display. There may be multiple advertisements drawn. The next step is for the application to calculate the next scene 37. The next scene is drawn to an OSB 40 using a modified painter's algorithm 39. Next the OSB is drawn to the display 56 using the negative blending function. The next step 41 checks to see if there is another advertisement to display. If there is another advertisement to display the algorithm goes to step 36 retrieve next advertisement. If there is not another r advertisement to display the algorithm goes to step 51 draw advertisement to display.

Figure 16A:
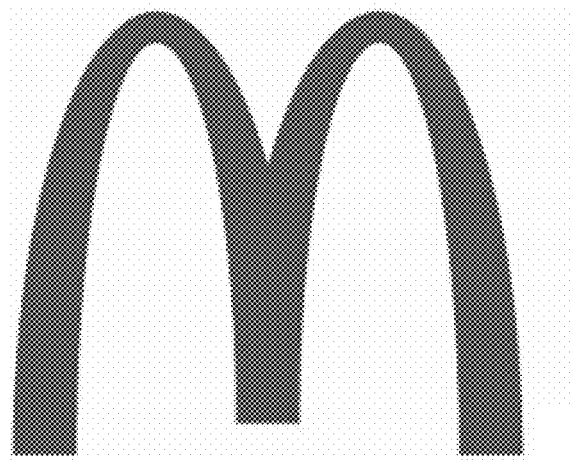
FIG. 16A illustrates a sample advertisement.
Figure 16B:
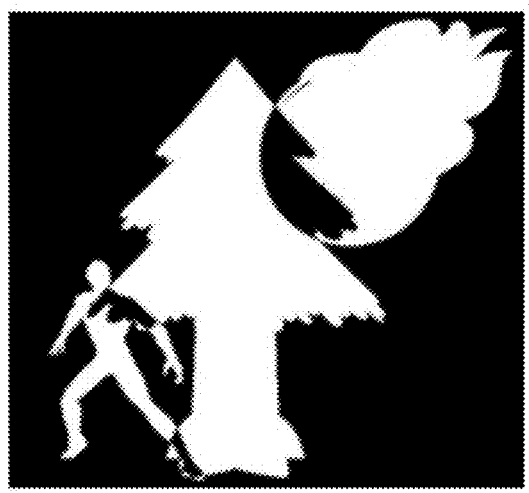
FIG. 16B illustrates an onscreen buffer.
Figure 16C:
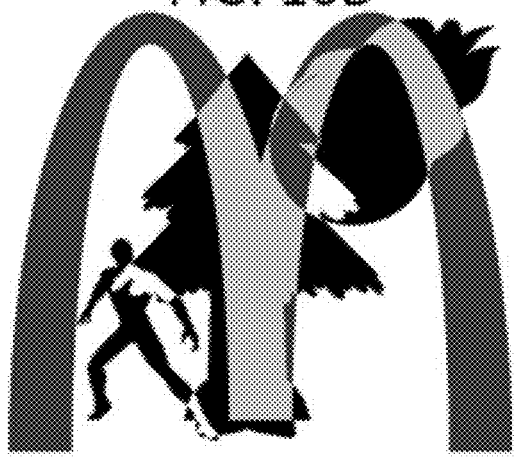
FIG. 16C illustrates an offscreen buffer drawn over a sample advertisement with negative blending function.

FIG. 16A shows a sample advertisement. FIG. 16B shows the final OSB from FIG. 14. FIG. 16C shows the result of drawing the OSB from FIG. 16B to the sample advertisement of FIG. 16A using the negative blending function. Note that where the OSB is black the original colors of the advertisement are displayed and where the OSB is white the negative of the original colors of the advertisement are displayed.

Figure 16D:
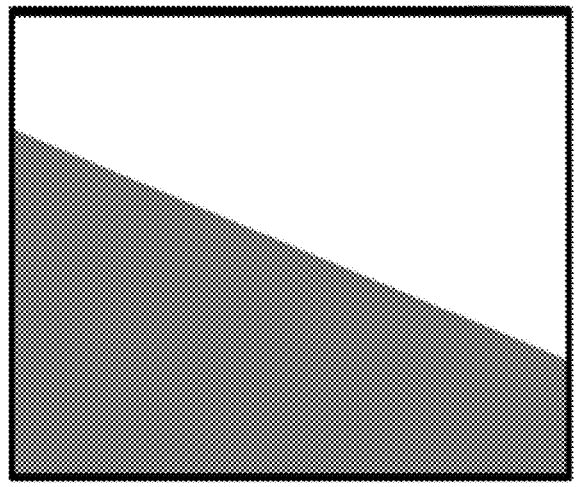
FIG. 16D illustrates grayness problem before negating image.
Figure 16E:
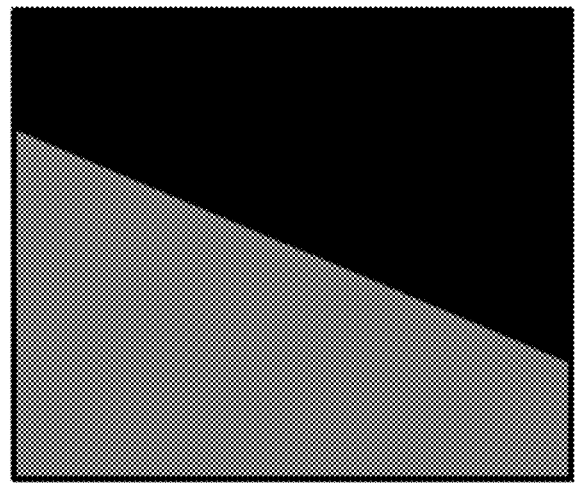
FIG. 16E illustrates grayness problem after negating image.

When context2 has regions that are gray the contrast can be too low to discern actors and entities. FIG. 16D shows a representation of an image advertisement with a large gray area covering the bottom left half of the image. FIG. 16D is the original image. FIG. 16E represents the negative of the image. Note: the negative of gray is gray.

Figure 17A:
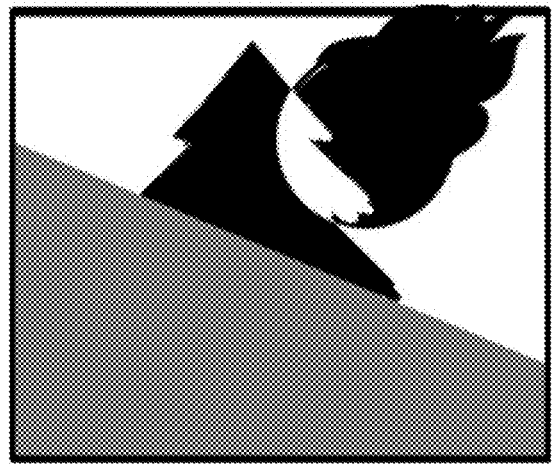
FIG. 17A illustrates grayness problem with blending before negating image.
Figure 17B:
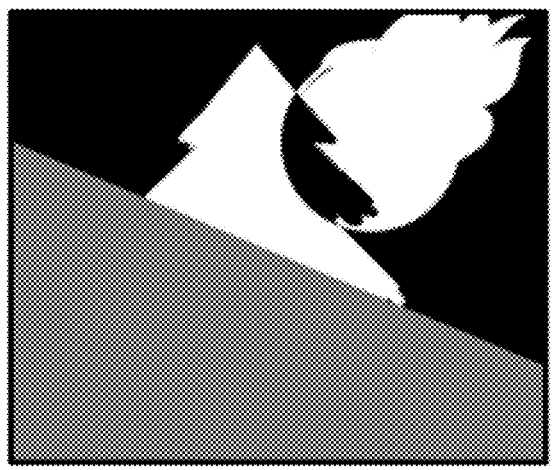
FIG. 17B illustrates grayness problem with blending after negating image.

FIG. 17A and FIG. 17B visualize the grayness problem. FIG. 17A shows FIG. 16B drawn onto FIG. 16D using a negative blending function. FIG. 17B shows FIG. 16B drawn onto FIG. 16E using a negative blending function. Note that whether FIG. 16B is drawn onto the original image using a negative blending function as in FIG. 17A or is drawn onto the negative of the original image using a negative blending function as in FIG. 17B, the region in gray does not have enough contrast to discern between actors and entities and background in the lower left half of the image, i.e. the man actor is not discernible.

Figure 18A:
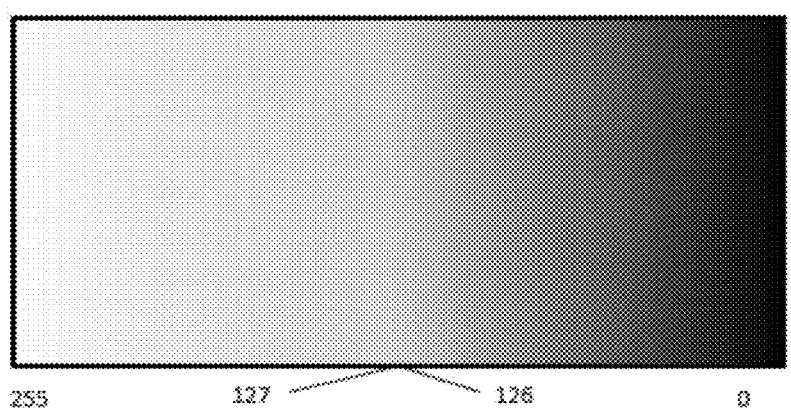
FIG. 18A illustrates 256 shades of gray.
Figure 18B:
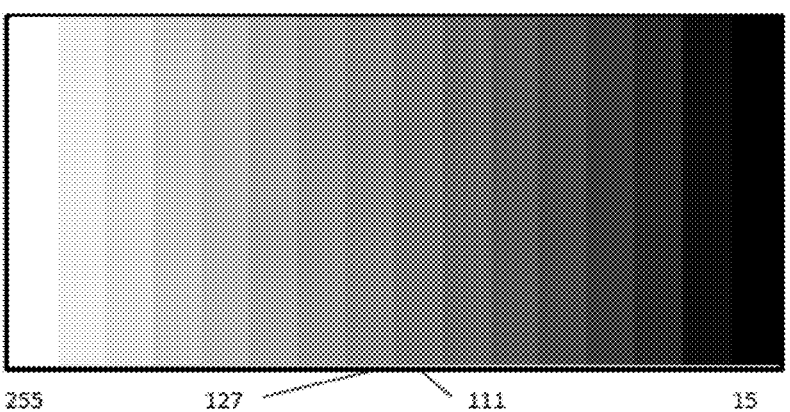
FIG. 18B illustrates 16 shades of gray.

In the typical RGB color scheme colors that are close to (127,127,127) are gray. In FIG. 18A it is difficult to discern between the gray color 127 and the gray color 126 because there are 256 shades of gray. It is easier to discern between 16 shades of gray, e.g. it is easy to discern between 127 and 111 in FIG. 18B. FIG. 18A shows 256 shades of gray. FIG. 18B shows 16 Shades of gray. One grayness solution is to shift the negative of gray 16 levels to the left (or to the right) so that the negative of 127 is 111.

Figure 19:
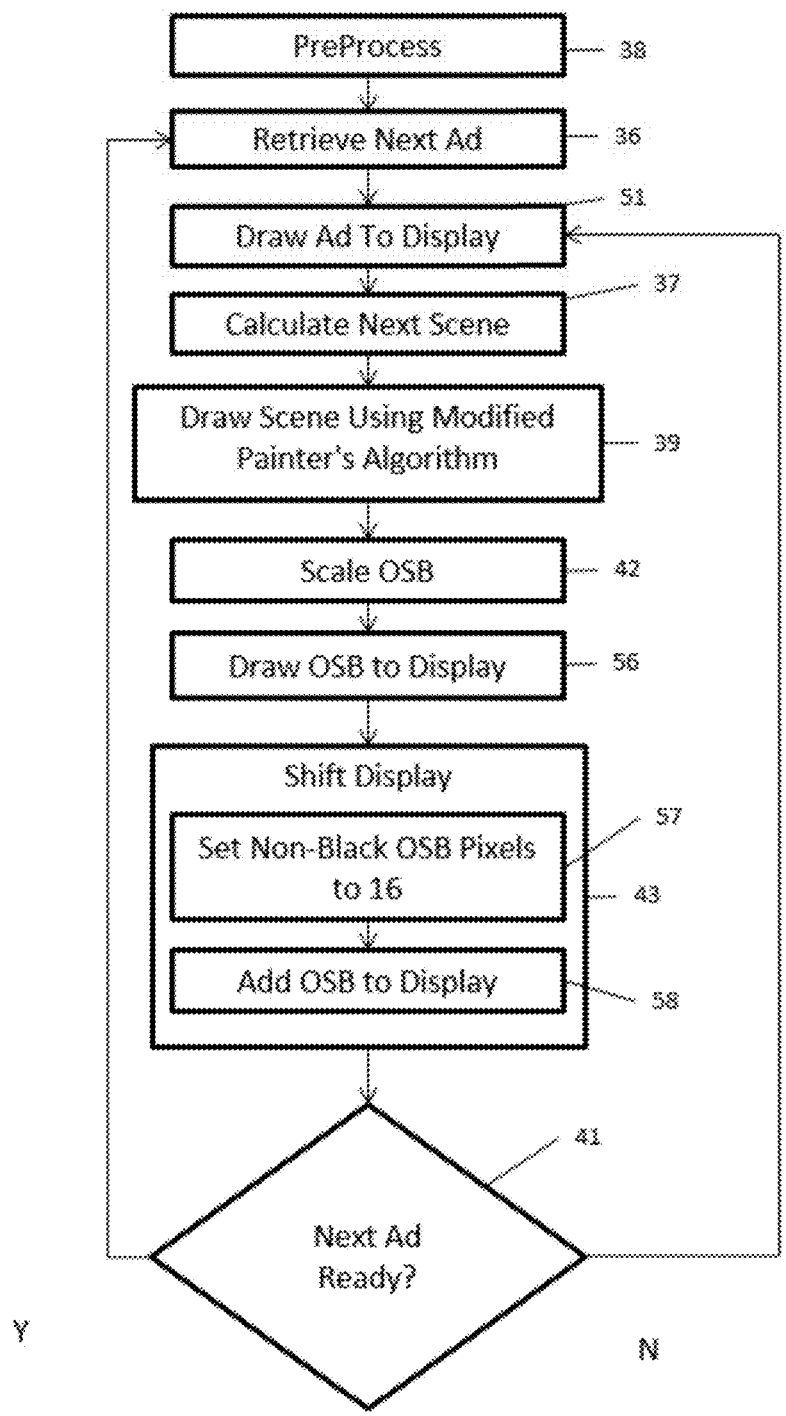
FIG. 19 illustrates a solution to grayness problem.

FIG. 19 shows a solution to the grayness problem that shifts the negative of gray 16 levels to the left. The algorithm in FIG. 19 is similar to the algorithm in FIG. 15 with a few additional steps. After the preprocess step 38 and the retrieve next ad step 36 and the draw ad to display step 51 and the calculate next scene step 37 and the modified painter's algorithm step 39 draws every layer to the OSB the pixels in the OSB are all either white (255) or black (0). One grayness solution shifts white to the left 16, i.e. the grayness solution replaces every OSB pixel that is 255 with 255−16=239. This is the scaling step 42. Drawing the OSB to the display 56 using the negative blending function C=255−ABS(255−A−B) effectively scales the negative dynamic range from 0.255 to 16.239 because the pixels in the OSB are either 0 or 239. At this point the negative of 128 is still 127. The shifting step, 43, is next applied to shift the negative of 128 to 112. The shifting step has two phases; first 57 sets every non-black and non-transparent OSB pixel to the value 16, then 58 draws the OSB to the display using an additive blending function (or subtractive function). A typical additive blending function is C=MLN(255, (A+B)). Because the shifting step effectively scaled the dynamic range to 16.239 adding 16 will result in a dynamic range of 32.255. Subtracting 16 will result in a dynamic range of 0.223. In either case the negative of 128 is shifted by 16 values. The next step 41 checks to see if the next advertisement is ready to display.

Figure 20:
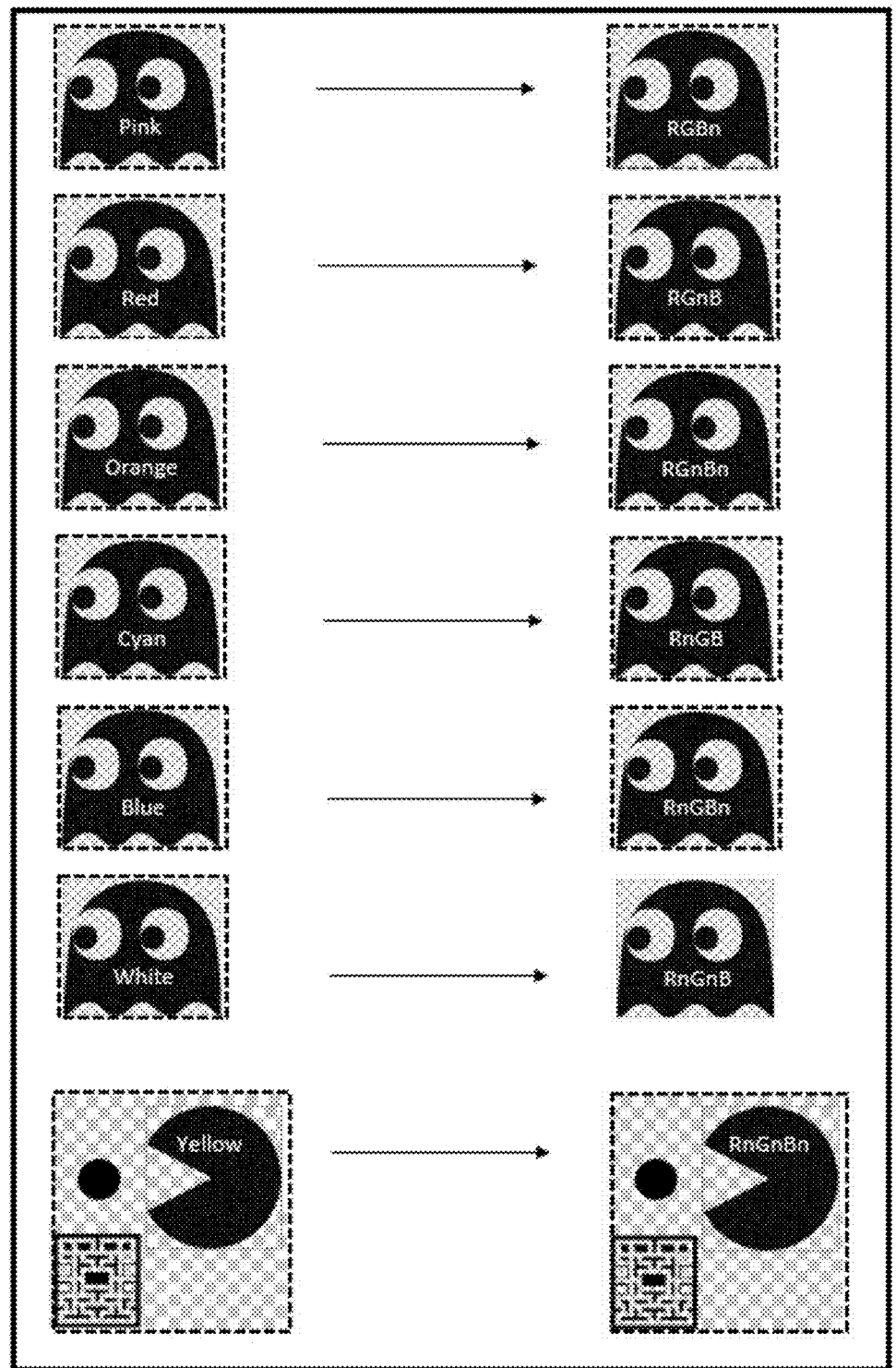
FIG. 20 illustrates a modified preprocessing step with eight states.

There are many applications that can be drawn using the positive/negative two state solution outlined above. But some applications require more than two states. One example is the well-known PacMan application. An eight state solution sec a modified preprocessing step. FIG. 20 shows a modified preprocessing step 44 that assigns various RGB channel negations to actors, entities and background of the PacMan application. Note that seven permutations of negating color channels are available to draw actors, entities, and backgrounds. Assigning an RGB channel negation is the same as drawing in a particular color, e.g. assigning RnGBn is conceptually the same as coloring in the color magenta hi FIG. 20 the original actors, entities, and backgrounds of the application are shown on the left and the preprocessed actors, entities and backgrounds of the application are shown on the right.

Figure 21:
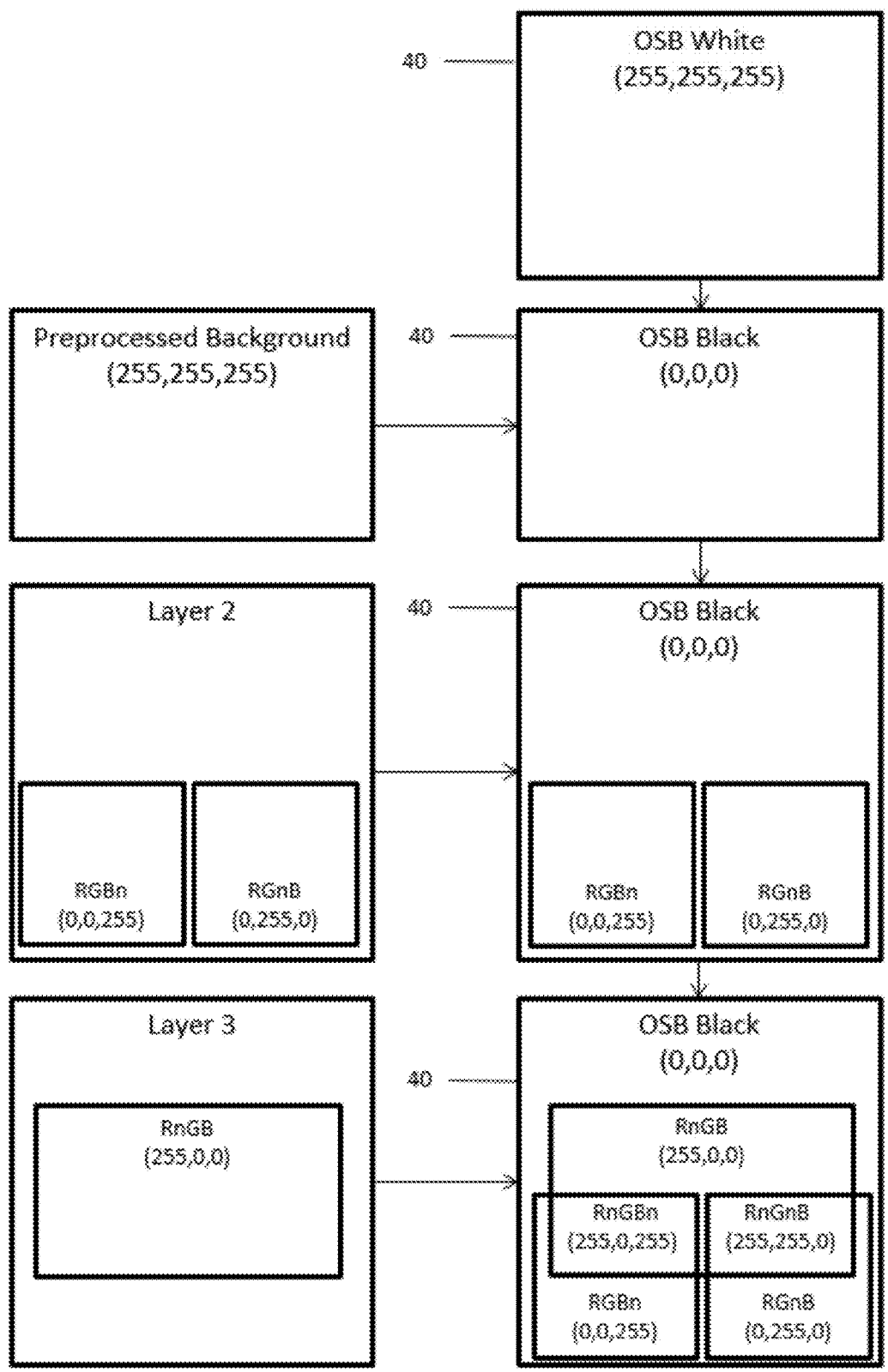
FIG. 21 illustrates a modified painter's algorithm with eight states.

FIG. 21 demonstrates the modified painter's algorithm using RGB colors. First the OSB 40 is set to white (255, 255,255). Then the preprocessed background (layer1) is drawn to the OSB using a negative blending function. For the purpose of explanation, the entire preprocessed background is white (255,255,255). Note that this results in the entire OSB being black (0,0,0). That is because the effect of the negative blending function is to negate the color channel of every pixel in the OSB when the color channel of the layer being drawn is white (255,255,255). Because the entire background layer is white (255,255,255) the blending function negates all three channels of every pixel in the OSB. The next furthest layer from the viewer, layer2, is then drawn onto the OSB 40 using a negative blending function. Two rectangles are defined to be in layer2. One is the color RGBn (0,0,255) and one is the color RGmB (0,255,0). Note that white (255) color channels of pixels drawn in layer2 negate color channels of pixels in the OSB 40, i.e. a white (255) color channel pixel in layer2 will mm a black (0) color channel pixel in the OSB white (255), and a white (255) color channel pixel in layer2 will turn a white (255) color channel pixel in the OSB black (0). Note that transparent color channel pixels in a layer do not affect corresponding color channel pixels in the OSB. Note that black (0) color channel pixels in a layer do not affect corresponding color channel pixels in the OSB. Layer 3 is shown as a rectangle colored RnGB (255,0,0) which is drawn to the OSB last.

Figure 22:
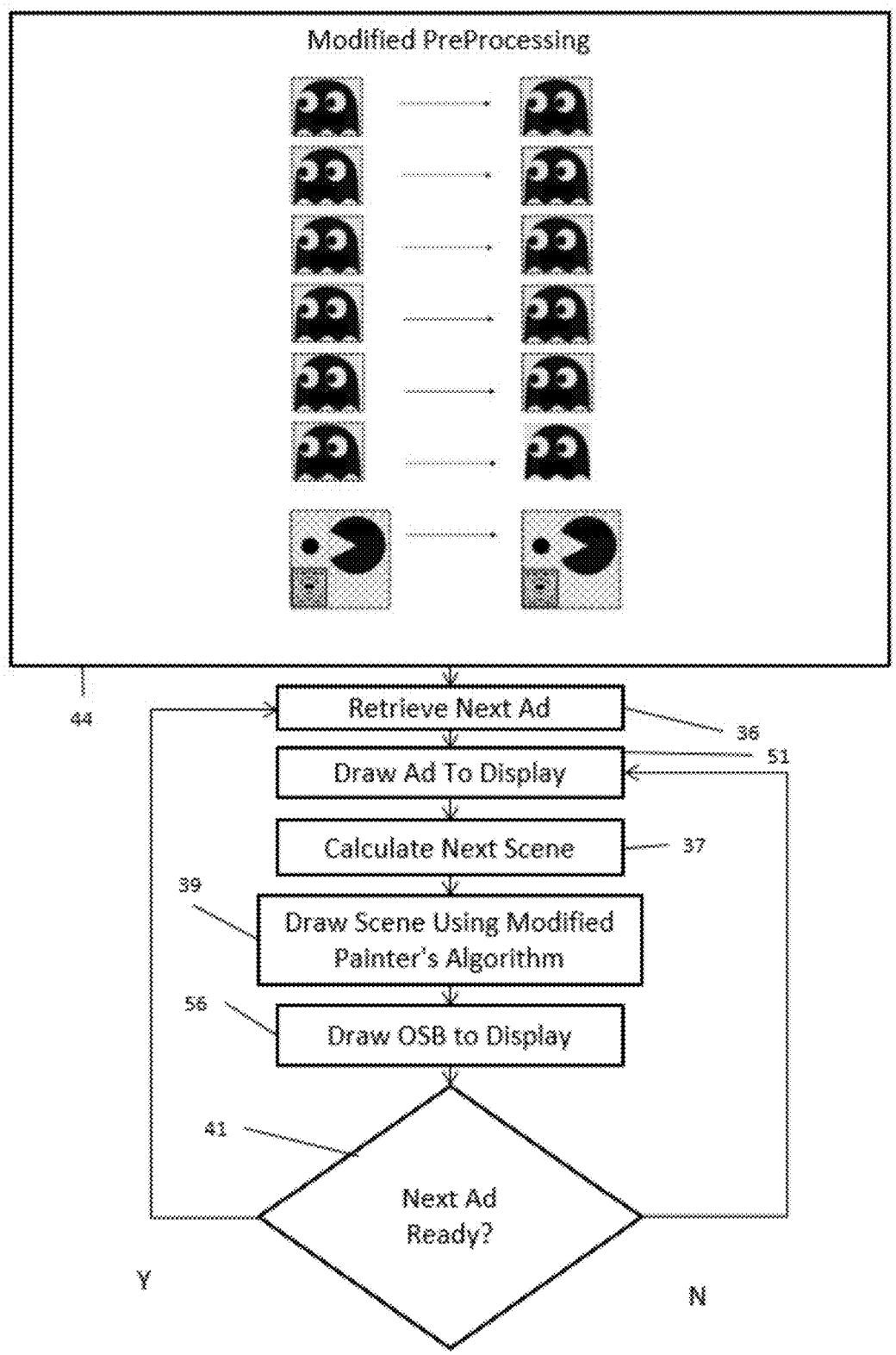
FIG. 22 illustrates a flow chart of a modified application thread with eight states with advertisement thread.

FIG. 22 shows the modified application thread using the modified preprocessing step 44 described in FIG. 20 combined with the advertisement thread to display both application (context1) and advertisement (context2) at the same time using the same pixels by displaying the true color information of context2 and overlapping the shape information of context1 as a function applied to the time colors of context2. In this embodiment the shape information of context1 is displayed in various permutations of negations of the colors of context2. After the modified preprocess step 44 the successive steps are 36 retrieve next advertisement, 51 draw advertisement to display, 37 calculate next scene, 39 draw scene using modified painter's algorithm, and 56 draw OSB to display. Finally step 41 checks to see if the next advertisement is ready.

Figure 23:
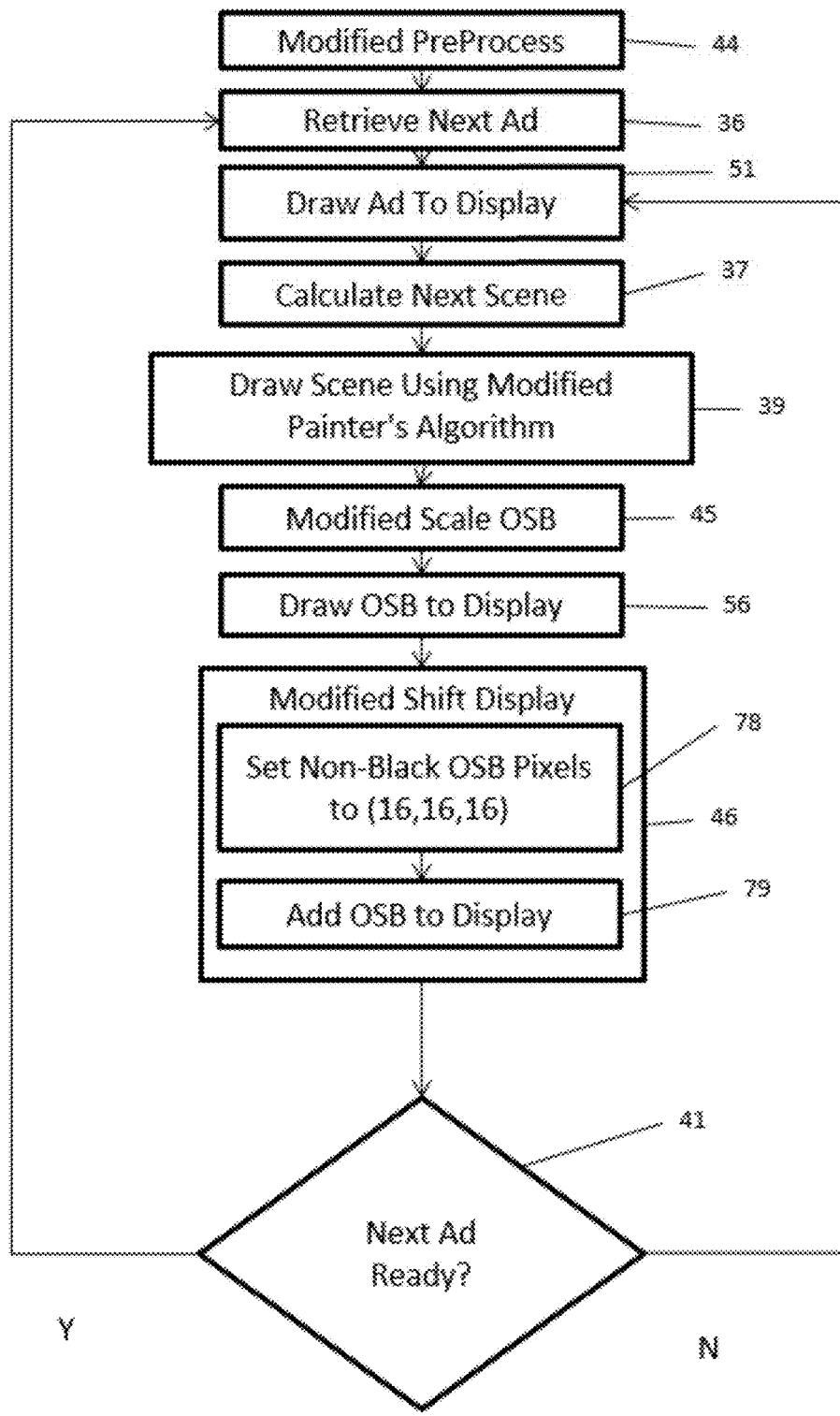
FIG. 23 illustrates a flow chart for a solution to color channel grayness problem.

As shown in FIG. 7A and FIG. 7B when negating individual RGB channels the 'grayness' problem can be seen in each separate channel, i.e. there are 'redness', 'greenness' and 'blueness' problems. FIG. 23 shows a solution to the color channel grayness problem as a modification of the grayness solution shown in FIG. 19. After the modified preprocess step 44 and the retrieve next ad step 36 and the draw ad to display step 51 and the calculate next scene step 37 and the modified painter's algorithm step 39 draws every layer to the OSB the pixels in the OSB are all permutations of 0 and 255, i.e. (0,0,0), (0,0,255), (0,255,0), (0,255,255), (255,0,0), (255,0,255), (255,255,0) or (255,255,255). The channel grayness solution shifts white to the left 16, i.e. the grayness solution replaces every OSB pixel channel that is 255 with 255-16=239, i.e. (0,0,0), (0,0,255), (0,255,0), (0,255,255), (255,0,0), (255,0,255), (255,255,0), (255,255,255) are correspondingly replaced with (0,0,0), (0,0,239), (0,239,0), (0,239,239), (239,0,0), (239,0,239), (239,239,0), or (239,239,239). This is the modified scaling step 45. Drawing the OSB to the display 56 using the negative blending function effectively scales the negative dynamic range from (0,0,0) . . . (255,255,255) to (16,16,16) . . . (239,239,239). At this point the negative of a color channel value of 128 is still 127. The modified shifting step, 46, is next applied to shift the negative of 128 to 112. The shifting step has two phases; first 78 sets every non-black OSB pixel to (16,16,16), then 79 draws the OSB to the display using an additive blending function (or subtractive function). A typical additive blending function is C=MIN(255, (A+B)). Because the shifting step effectively scales the dynamic range to (16,16,16) . . . (239,239,239) adding (16,16,16) will result in a dynamic range of (32,32,32) . . . (255,255,255). Subtracting (16,16,16) will result in a dynamic range of (0,0,0) . . . (223,223,223). In either case the negative of 128 is shifted by 16 values. The next step 41 checks to see if the next advertisement is ready to display.

Figure 24:
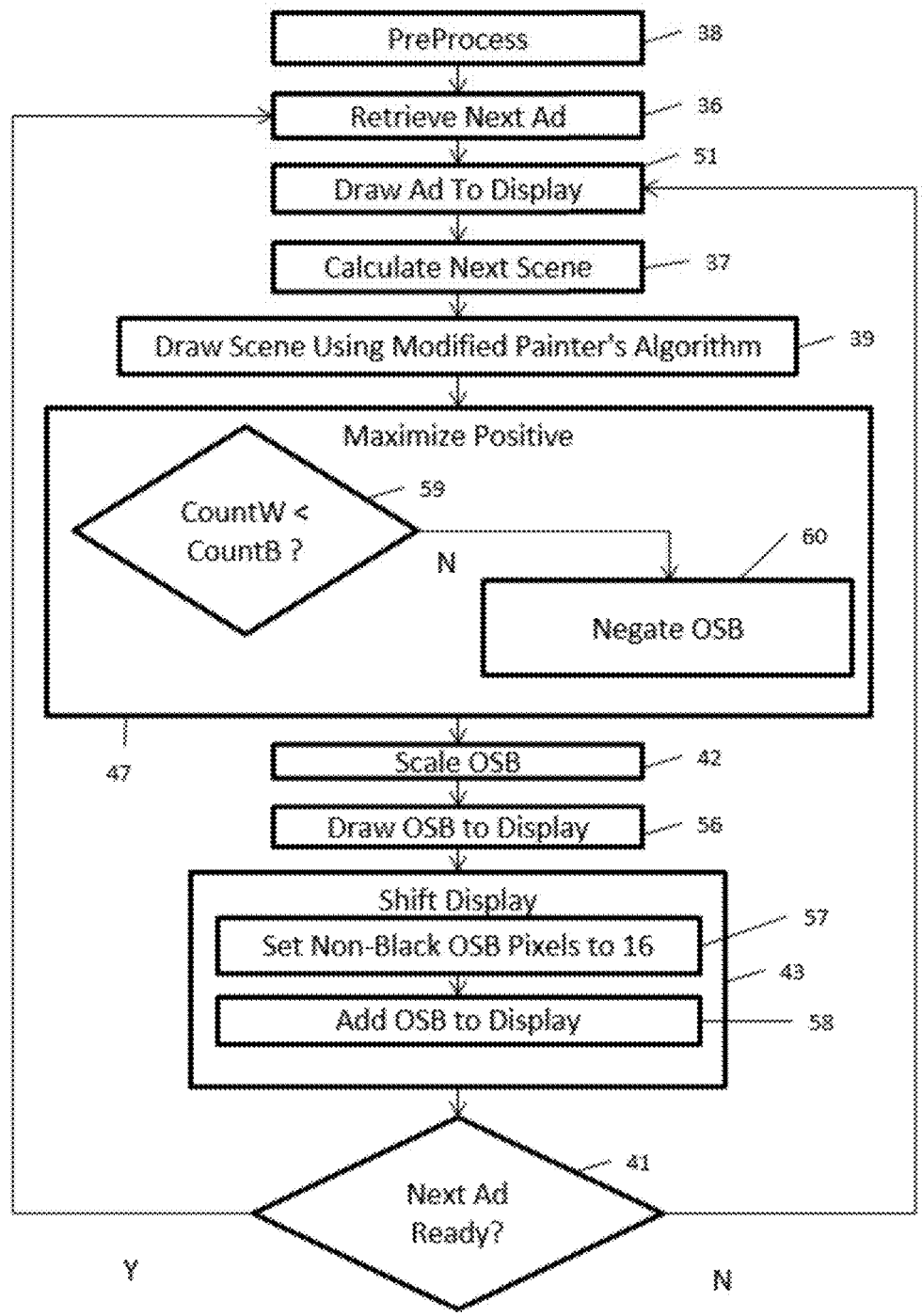
FIG. 24 illustrates a flow chart to maximize original RGB.

For some embodiments of this invention is desirable to maximize the number of context2 pixels displayed using their original RGB values. FIG. 24 shows adding a step 47 to the algorithm in FIG. 19 to maximize the positive RGB displayed. After the preprocess step 38 and the retrieve next ad step 36 and the draw ad to display step 51 and the calculate next scene step 37 and the modified painter's algorithm step 39 draws every layer to the OSB the pixels in the OSB are all either white (255) or black (0). Step 47 counts the number of white pixels, countW, and counts the number of black pixels, countB, in the OSB. These counts are compared in 59. When countW<countB there will be more context2 pixels displayed in original RGB values than in negative RGB values. If countW>=countB then the entire OSB is negated in 60 which results in countW being less than countB. This negation of the OSB maximizes the number of context2 pixels displayed using their original RGB values. Next is the scaling step 42 followed by drawing the OSB to the display 56, then the shifting step, 43, is applied to shift the negative of 128 to 112. The shifting step has two phases; first 57 sets every non-black and non-transparent OSB pixel to the value 16, then 58 draws the OSB to the display using an additive blending function (or subtractive function). The next step 41 checks to see if the next advertisement is ready to display.

Figure 25:
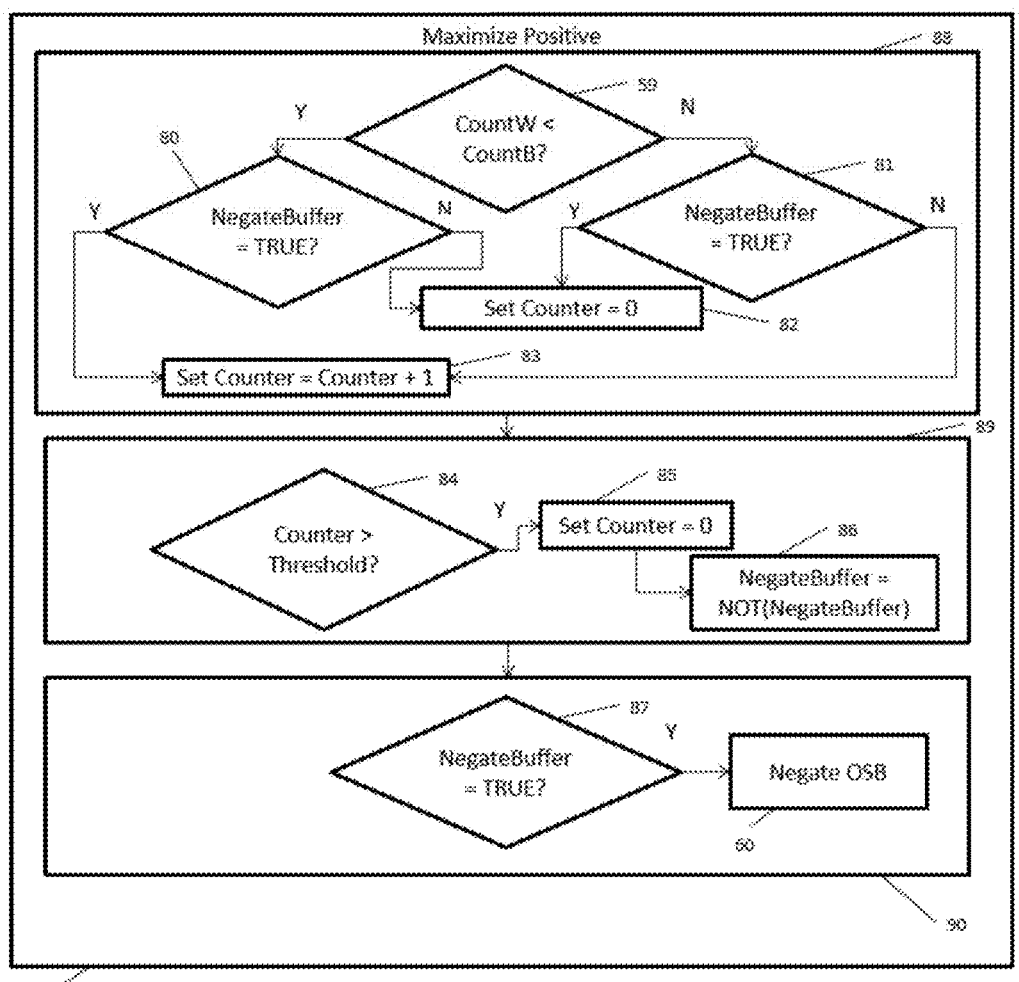
FIG. 25 illustrates a flowchart for implementing flicker buffer.

Some applications can have interactions that result in the ratio of countW/countB varying quickly above and below 50%. Negating the OSB at a fast pace will produce a flicker. FIG. 25 shows a sample flicker buffer 48 that could replace step 47 in FIG. 24. The flicker buffer contains a flag, negateBuffer, and a counter. Counter. negateBuffer is initially set to false. Counter is initially set to 0. The sample flicker buffer has 3 steps: step SS either increments Counter or sets Counter to 0, step 89 decides whether to negate negateBuffer, and step 90 negates the OSB if NegateBuffer is true. In step 88 CountW is compared to CountB 59. If CountW<CountB then 80 checks to see if NegateBuffer is true. If NegateBuffer is true then Counter is incremented in 83, otherwise Counter is set to 0 in 82. If instead CountW is not less than CountB then 81 checks to see if NegateBuffer is true. If NegateBuffer is true then Counter is set to 0 in 82, otherwise Counter is incremented in 83. In step 89 Counter is compared to Threshold 84. If Counter>Threshold then Counter is set to 0 in 85 and NegateBuffer is negated in 86. Finally, in step 90 if NegateBuffer is true 87 that the OSB is negated in 60. This introduces a buffer that can reduce flicker.

Figure 26:
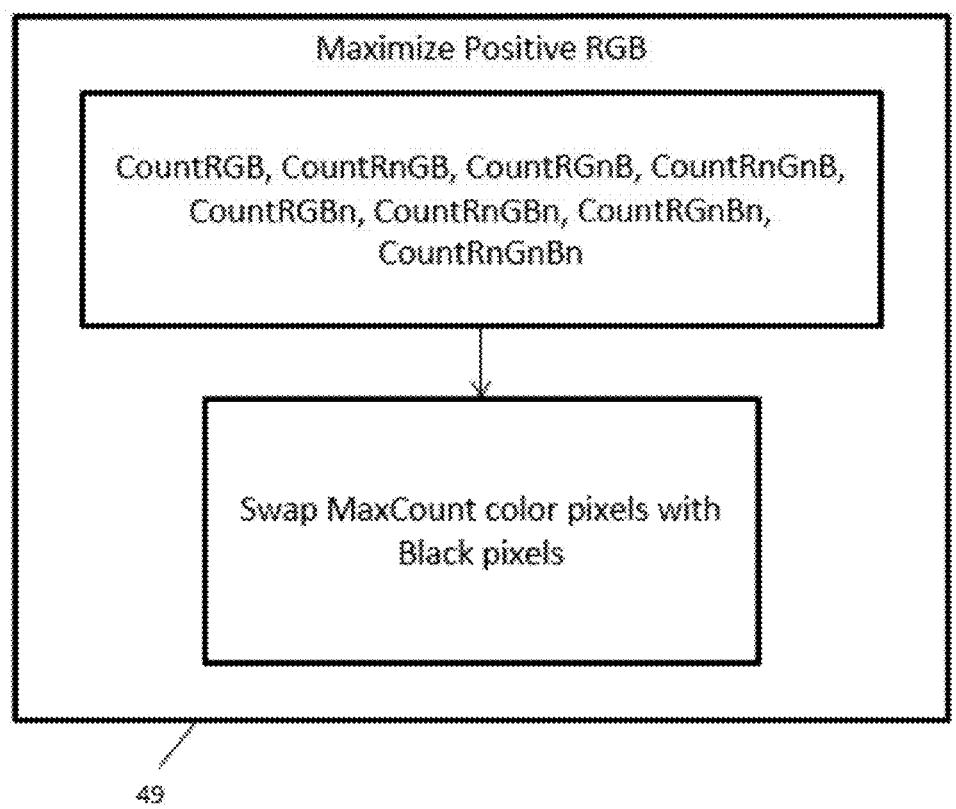
FIG. 26 illustrates a flow chart for maximizing RGB in eight state configurations.

Maximizing the number of context2 pixels displayed in their original RGB values is more complicated when using the eight state configuration. Instead of counting the number of white and the number of black pixels in the OSB it is necessary to count the number of pixels in each of the eight color permutations. FIG. 26 shows a step 49 that could be inserted between step 39 and step 45 of FIG. 23. Step 49 chooses the color permutation with the maximum number of pixels in the OSB. Instead of negating the OSB the color permutation of the pixels with the maximum number is swapped with the color of the pixels that are black. The flicker problem can exist when using the eight state configuration. A flicker solution similar to the two state configuration can be employed to reduce flicker.

Figure 27A:
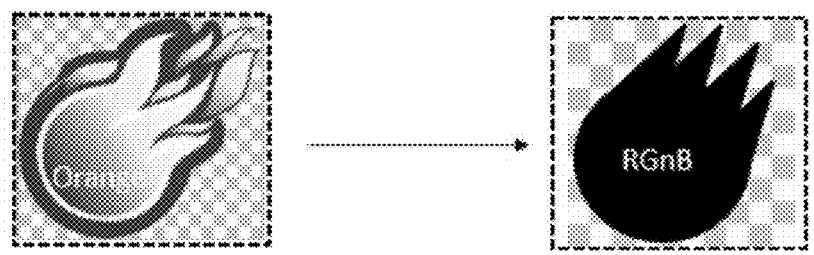
FIG. 27A illustrates a user defined preprocessing with modified shape.
Figure 27B:
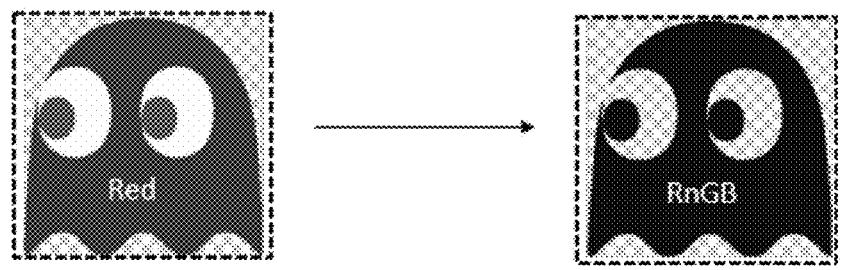
FIG. 27B illustrates a user defined preprocessing with modified transparency.

The preprocessing steps described above could be automated or they could be done by an application programmer. If an application programmer does the preprocessing steps they might provide two or more sets of image definitions: One to display the application in positive RGB colors, i.e. without another context, and one to display the application in the negative of another context. An application programmer may want to define their own preprocessing images so they can choose which aspects of their images are defined by which of the seven non-positive RGB colors. An application programmer may want to define their own preprocessing images so they can compensate for loss of detail, i.e. an application programmer may wan't to draw their comet actor with a more pointed tail as shown in FIG. 27A. An application programmer might want to draw their PacMan ghost eyes as transparent as shown in FIG. 27B.

Figure 28A:
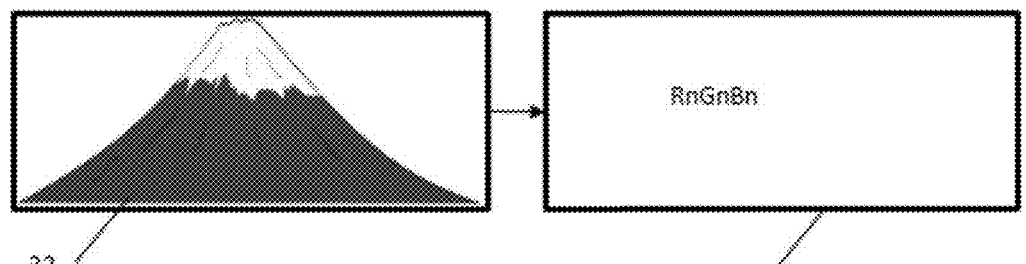
FIG. 28A illustrates a preprocess for a background layer.
Figure 28B:
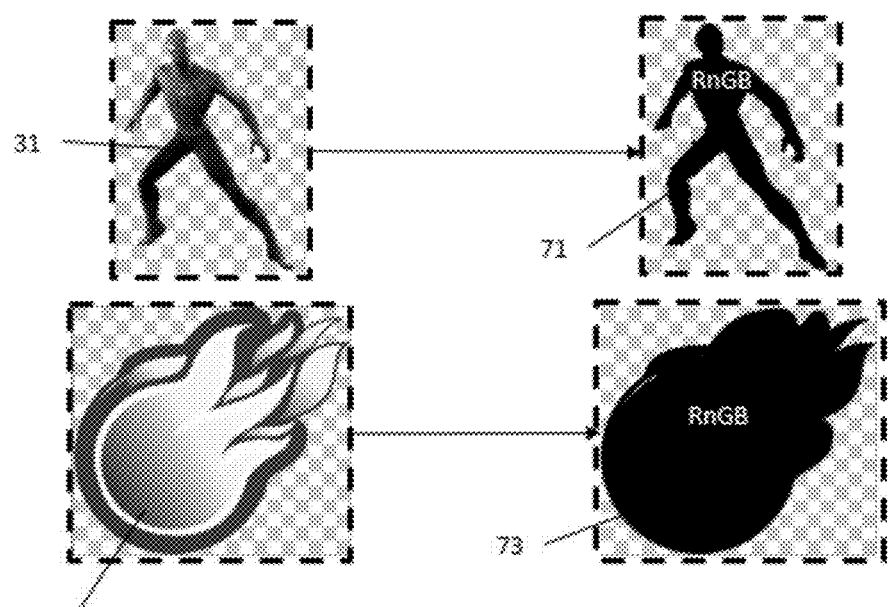
FIG. 28B illustrates a preprocess for a sample layer two.
Figure 28C:
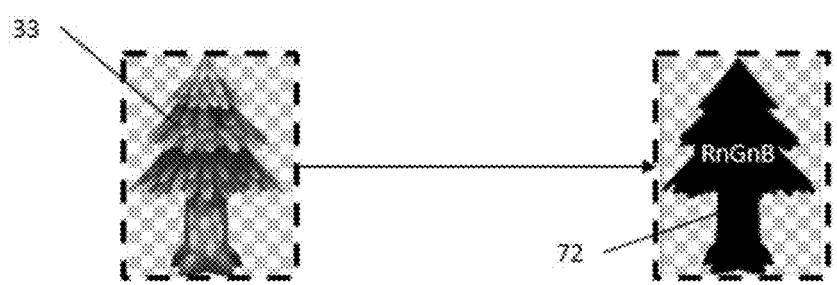
FIG. 28C illustrates a preprocess for a sample layer three.

The eight state configuration can be used to implement layers. FIG. 28A, FIG. 28B and FIG. 28C show the preprocessing step of replacing every non-transparent pixel in actors, entities, and backgrounds with one of the non-black permutations that negate channels, i.e. (0,0,0), (0,0,255), (0,255,0), (0,255,255), (255,0,0), (255,0,255), (255,255,0), or (255,255,255). Note: (0,0,0) is black and corresponds to RGB, (0,0,255) is blue and corresponds to RGBn, (0,255,0) is green and corresponds to RGnB, etc. Every aspect of the application that is to be drawn can first be set to one of the seven non-black colors. The original image is on the left and the preprocessed image is on the right. FIG. 28A shows the background 32 on the left and the preprocessed background 70 to be RnGnBn=(255,255,255) which is white. Note that the preprocessed background image 70 is filled completely with a single color. FIG. 28B shows preprocessing layer2 which contains the man actor 31 and the comet actor 34 on the left and the preprocessed man actor 71 and the preprocessed comet actor 73 on the right. Note that the preprocessed man actor 71 is filled with RnGB=(255,0,0) and the preprocessed comet actor 73 is filled with RnGB. FIG. 28C shows preprocessing layer3 which contains the tree entity 33. The tree entity 33 is on the left and the preprocessed tree entity 72 is on the right and is filled with RnGnB=(255,255,0). Layers can appear as 'behind' and in front of other layers when all actors, entities and backgrounds in each layer are filled with the same color channel permutation and each layer uses a different color channel permutation.

Figure 29A:
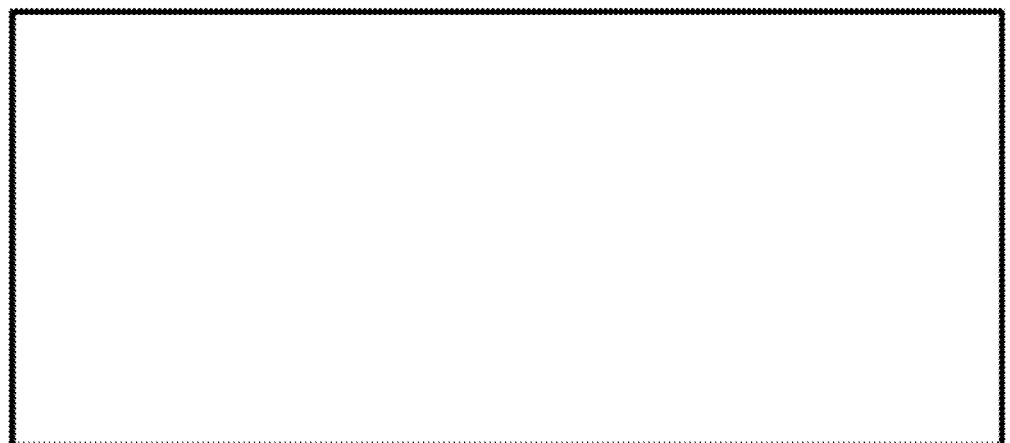
FIG. 29A illustrates a background layer drawn using painter's algorithm.
Figure 29B:
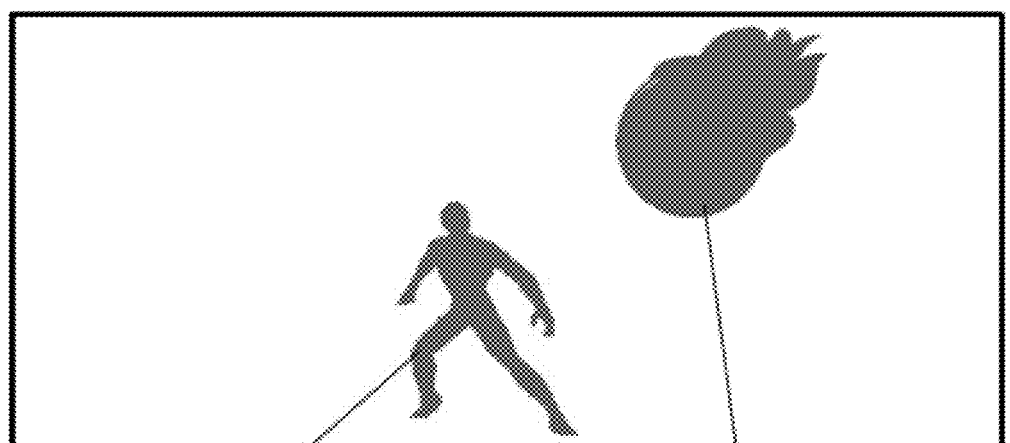
FIG. 29B illustrates a second layer drawn using painter's algorithm.
Figure 29C:
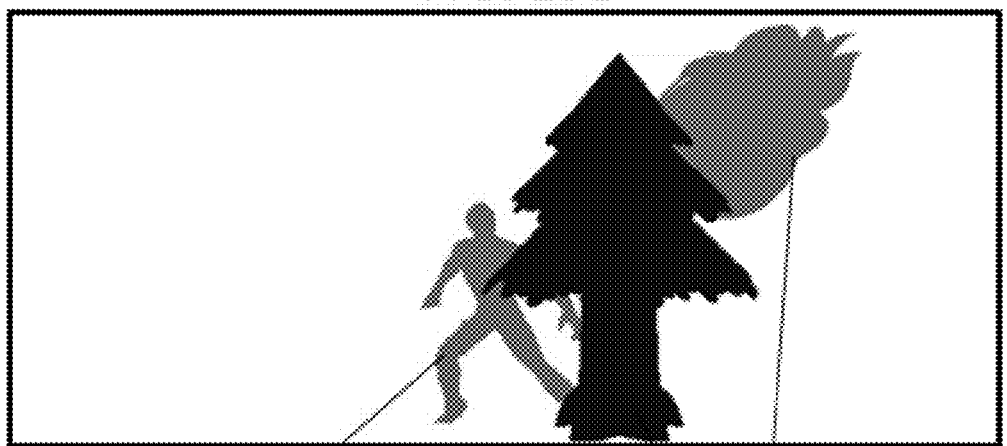
FIG. 29C illustrates a third layer drawn using painter's algorithm.

FIG. 29A, FIG. 29B and FIG. 29C show background and layers drawn using the painter's algorithm. The painter's algorithm draws scenes to display some actors and entities as 'behind' other actors and entities and 'in front of' other actors, entities and backgrounds. First the preprocessed background 70 is drawn as in FIG. 29A layer2 with the preprocessed man actor 71 and the preprocessed comet actor 73 is drawn over the background as in FIG. 29B, and then layer3 is drawn over previous layers as in FIG. 29C. FIG. 29C shows that the preprocessed tree entity 72 obscures parts of the preprocessed man actor 71 and obscures parts of the preprocessed comet actor 73. Note that all actors and entities obscure parts of the preprocessed background 70.

Figure 30:
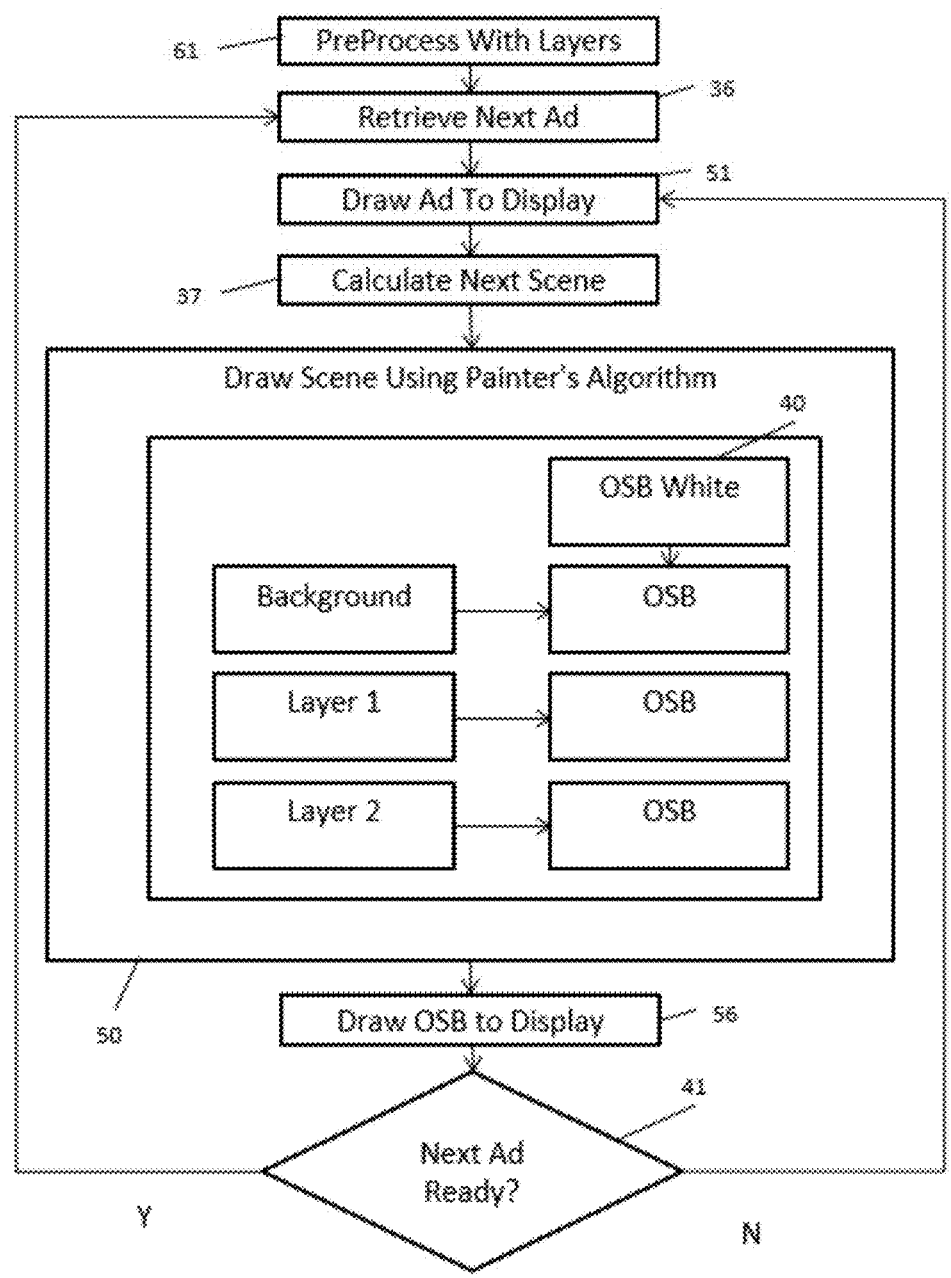
FIG. 30 illustrates eight state configurations with layers.

FIG. 30 is a modification of the algorithm from FIG. 15 with the scene being drawn with a standard painter's algorithm 50 instead of a modified painter's algorithm labeled 39 in FIG. 15. FIG. 30 also replaces the preprocessing step 38 in FIG. 15 with the preprocessing step with layers 61 described in FIG. 28A, FIG. 28B and FIG. 28C. The standard painter's algorithm draws without the negative blend function as in FIG. 29A, FIG. 29B and FIG. 29C. Each layer is drawn on top of previous layers and obscures pixels where there is overlap. FIG. 30 shows the modified preprocessing step 61 replaces every non-transparent pixel in actors, entities, and backgrounds with non-black permutations that negate channels. The next step is to retrieve the next advertisement (context2) 36. The current advertisement is drawn 51 to the display until another advertisement is retrieved. The next step is to calculate the next scene 37. The next scene is drawn to an OSB 40 using the standard painter's algorithm 50. Next the OSB is drawn 56 to the display using the negative blending function. The next step 41 checks to see if there is another advertisement to display. If there is another advertisement to display the algorithm goes to step 36 retrieve next advertisement. If there is not another advertisement to display the algorithm goes to step 51 draw advertisement to display.

In some embodiments this invention can display multiple advertisements concurrently with an application. For instance, context2 could consist of 6 or more different banner advertisements that are tiled. Context1 could be displayed as filtered images of multiple advertisements In an embodiment, a computer-readable storage medium may be RAM, ROM, EEPROM, CD-ROM or other optical disk storage, magnetic disk storage or other magnetic storage devices, or any other hardware medium that can be used to carry or store desired program code means in the form of instructions or data structures and that can be accessed by a general-purpose or special-purpose computer, or a general-purpose or special-purpose processor.

It would be understood that the invention described herein requires at least a controller capable of executing image processing programs and a memory to store programs executed by the controller and images processed by the controller. The controller may comprise a central processing unit (CPU), a computer, a computer unit, a data processor, a microcomputer, microelectronics device, or a microprocessor. The memory includes, but is not limited to a read/write memory, read only memory (ROM), random access memory (RAM), DRAM, SRAM etc.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

LIST OF NUMBERED ITEMS

1) Display
2) banner ad
3) application
4) interstitial
5) application w/in-app ad
6) actor/entity allocated to displaying ads
7) ad displayed on actor/entity
8) ad full screen
9) PacMan character
10) Checkerboard transparent pixels
11) Bounding box
12) Light gray
13) Medium gray
14) Dark gay
15) Negative of light gray=dark gray
16) Negative of medium gray=medium gray
17) Negative of dark gray=light gray
18) Pinky
19) Clyde
20) Blinky
21) Inky
22) Red histogram
23) Light red
24) Medium red
25) Dark red
26) Negative of red histogram
27) Negative of dark red=light red
28) Negative of medium red=medium red
29) Negative of light red=dark red
30) Red histogram with mostly medium red
31) Man actor 32) Background image
33) Tree entity
34) Comet actor
35) Painter's algorithm
36) Retrieve next
37) Calculate next scene
38) Preprocess step
39) Modified painter's algorithm
40) Offscreen buffer
41) Test if next ad received
42) Scaling step
43) Shifting step
44) Modified preprocess step with color channels
45) Modified scaling step
46) Modified shifting step
47) Maximize positive RGB
48) Flicker buffer
49) Maximize positive RGB eight color
50) Standard painter's algorithm
51) Draw Ad to Display
52) Preprocessed Background
53) Preprocessed Man actor
54) Preprocessed Tree entity
55) Preprocessed Comet actor
56) Draw OSB to Display
57) Set Pixels to 16
58) Add OSB to Display
59) Compare Counts
60) Negate OSB
61) Preprocess with layers
62) Pacman character RnGB
63) Pacman character RGnB
64) Pacman character RnGnB
65) Pacman character RGBn
66) Pacman character blue
67) Pacman character white
68) Pacman character RGnBn
69) Pacman character RnGBn
70) Preprocessed Background RnGnBn
71) Preprocessed Man actor RnGB
72) Preprocessed Tree entity RnGnB
73) Preprocessed Comet actor RnGB
74) Man actor without color information
75) Background without color information
76) Tree entity without color information
77) Comet actor without color information
78) Set pixels to (16,16,16)
79) Modified add OSB to display
80) NegateBuffer compare
81) NegateBuffer compare 2
82) Set Counter to 0
83) Increment Counter
84) Compare Counter to Threshold
85) Set Counter to 0
86) Negative NegateBuffer
87) Check if NegateBuffer is true
88) Increment Counter or set Counter to 0
89) Test to negater NegateBuffer
90) Test to negate OSB

What is claimed is:

1. An image processing device, comprising: a processor coupled to a memory; and a display screen, wherein the processor is configured to process a plurality of media formats stored in the memory, each of the plurality of media formats is made up of a digital image layer that includes at least non-transparent pixels; the processor configured to execute the following:
set the non-transparent pixels in each of the digital image layer of the plurality of media formats to a contrast state by application of one or more image filters of a plurality of image filters;
set pixels stored in an off-screen data buffer of the memory to pixels corresponding to a predetermined color scheme;
apply an image function to each of the plurality of media formats drawn successively to the off-screen data buffer so as to allow the plurality of overlapping media formats to be displayed on the display screen as see through,
wherein the one or more image filters manipulates the non-transparent pixels in each of the digital image layer of the plurality of media formats to a black and white version, and
wherein the plurality of image filters comprise multiple contrast filters applied successively and include a grayscale filter, a threshold filter, a sharpen filter, a posterize filter, and an assign bins filter.

2. The image processing device as set forth in claim 1, wherein the processor is further configured to simultaneously draw the off screen buffer and another media format to the display screen by using the same pixels and by displaying the true color information of the another media format and overlapping the shape information of the pixels in the off screen buffer as the image function applied to the true colors of the another media format.

3. The image processing device as set forth in claim 2, wherein the image function being a negative blending function that blends the pixels in the off-screen data buffer with the non-transparent pixels in the digital image layer to generate new pixel values in the off-screen data buffer.

4. The image processing device as set forth in claim 3, wherein the new pixel values are generated by negating every pixel in the digital image layer while drawing the digital image layer to the off-screen buffer.

5. The image processing device as set forth in claim 1, wherein the plurality of media formats include any digitally displayable information including images, videos, animations, graphs and text.

6. The image processing device as set forth in claim 1, wherein the contrast state being a white RGB color scheme.

7. The image processing device as set forth in claim 1, wherein the contrast state being one of a plurality of RGB color schemes.

8. A non-transitory computer-readable storage medium with an executable program stored thereon, wherein the program instructs a computer to perform the following steps:
processing a plurality of media formats where each of the plurality of media formats is made up of a digital image layer that includes at least non-transparent pixels;
setting the non-transparent pixels in each of the digital image layer of the plurality of media formats to a contrast state by application of one or more image filters of a plurality of image filters;
setting pixels stored in an off-screen data buffer to pixels corresponding to a predetermined color scheme;
applying an image function to each of the plurality of media formats drawn successively to the off-screen data buffer so as to allow the plurality of overlapping media formats to be displayed on the display screen as see through,
wherein the one or more image filters manipulates the non-transparent pixels in each of the digital image layer of the plurality of media formats to a black and white version, and wherein the plurality of image filters comprise multiple contrast filters applied successively and include a grayscale filter, a threshold filter, a sharpen filter, a posterize filter, and an assign bins filter.

9. The non-transitory computer-readable storage medium as set forth in claim 8, further comprising the step of:
simultaneously drawing the off screen buffer and another media format to a display screen by using the same pixels and by displaying the true color information of the another media format and overlapping the shape information of the pixels in the off screen buffer as the image function applied to the true colors of the another media format.

10. The non-transitory computer-readable storage medium as set forth in claim 9, wherein the image function being a negative blending function that blends the pixels in the off-screen data buffer with the non-transparent pixels in the digital image layer to generate new pixel values in the off-screen data buffer.

11. The non-transitory computer-readable storage medium as set forth in claim 10, wherein the new pixel values are generated by negating every pixel in the digital image layer while drawing the digital image layer to the off-screen buffer.

12. An image processing method, comprising:
processing, using a central processing unit, a plurality of media formats stored in a memory, each of the plurality of media formats is made up of a digital image layer that includes at least non-transparent pixels;
setting the non-transparent pixels in each of the digital image layer of the plurality of media formats to a contrast state by application of one or more image filters of a plurality of image filters;
setting pixels stored in an off-screen data buffer of the memory to pixels corresponding to a predetermined RGB color scheme;
applying an image function to each of the plurality of media formats drawn successively to the off-screen data buffer so as to allow the plurality of overlapping media formats to be displayed on the display screen as see through,
wherein the one or more image filters manipulates the non-transparent pixels in each of the digital image layer of the plurality of media formats to a black and white version, and
wherein the plurality of image filters comprise multiple contrast filters applied successively and include a grayscale filter, a threshold filter, a sharpen filter, a posterize filter, and an assign bins filter.

13. The image processing device as set forth in claim 12, further comprising the step of: simultaneously drawing the off screen buffer and another media format to the display screen by using the same pixels and by displaying the true color information of the another media format and overlapping the shape information of the pixels in the off screen buffer as the image function applied to the true colors of the another media format.

14. The image processing method as set forth in claim 13, wherein the image function being a negative blending function that blends the pixels in the off-screen data buffer with the non-transparent pixels in the digital image layer to generate new pixel values in the off-screen data buffer.

15. The image processing method as set forth in claim 14, wherein the new pixel values are generated by negating every pixel in the digital image layer while drawing the digital image layer to the off-screen buffer.

16. The image processing method as set forth in claim 12, wherein the contrast state being a white RGB color scheme.

17. The image processing method as set forth in claim 12, wherein the contrast state being one of a plurality of RGB color schemes including a white RGB color scheme.

18. The image processing method as set forth in claim 12, wherein the predetermined color scheme being a white RGB color scheme.

19. The image processing method as set forth in claim 12, wherein the plurality of media formats include any digitally displayable information including images, videos, animations, graphs and text.

20. The image processing method as set forth in claim 13, wherein the image function comprises one of grayscale, sepia, blur, brightness, contrast, invert, saturate, opacity, and blending.

21. The image processing device as set forth in claim 1, wherein the one or more image filters comprises one or more simple contrast filters which set the non-transparent pixels to black or white by using a predetermined threshold.

22. The non-transitory computer-readable storage medium as set forth in claim 8, wherein the one or more image filters comprises one or more simple contrast filters which set the non-transparent pixels to black or white by using a predetermined threshold.

23. The image processing device as set forth in claim 12, wherein the one or more image filters comprises one or more simple contrast filters which set the non-transparent pixels to black or white by using a predetermined threshold.

* * * * *